United States Patent
Sugiyama

(10) Patent No.: US 10,404,882 B2
(45) Date of Patent: Sep. 3, 2019

(54) IMAGE SENSOR UNIT, IMAGE READING APPARATUS, AND IMAGE FORMING APPARATUS

(71) Applicant: CANON COMPONENTS, INC., Kodama-gun, Saitama (JP)

(72) Inventor: Takeshi Sugiyama, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 15/825,292

(22) Filed: Nov. 29, 2017

(65) Prior Publication Data
US 2018/0152583 A1 May 31, 2018

(30) Foreign Application Priority Data
Nov. 30, 2016 (JP) ................................. 2016-233113

(51) Int. Cl.
| | | |
|---|---|---|
| *G06T 1/00* | (2006.01) | |
| *H04N 1/12* | (2006.01) | |
| *H04N 1/031* | (2006.01) | |
| *H04N 1/00* | (2006.01) | |
| *H04N 1/028* | (2006.01) | |

(52) U.S. Cl.
CPC ......... *H04N 1/0312* (2013.01); *H04N 1/1225* (2013.01); *G06T 1/0007* (2013.01); *H04N 1/00519* (2013.01); *H04N 1/02835* (2013.01)

(58) Field of Classification Search
CPC .......... H04N 9/30; H04N 2201/02412; H04N 2201/02416; H04N 2201/02431; H04N 2201/04755; H04N 5/335; H04N 1/03; H04N 2201/02493; H04N 1/00519; H04N 1/00602; H04N 1/02835; H04N 1/0312; H04N 1/1225
USPC ......................................... 358/474, 475, 509
See application file for complete search history.

(56) References Cited

U.S. PATENT DOCUMENTS

| | | | | |
|---|---|---|---|---|
| 6,909,085 B2* | 6/2005 | Huang | ..................... | H04N 1/03 250/239 |
| 8,988,742 B2* | 3/2015 | Sugiyama | .............. | H04N 1/031 358/474 |
| 2004/0124486 A1* | 7/2004 | Yamamoto | ........ | H01L 27/14618 257/433 |
| 2007/0030380 A1* | 2/2007 | Higuchi | ............ | H01L 27/14625 348/340 |
| 2009/0284808 A1* | 11/2009 | Hamada | ............. | H04N 1/00546 358/474 |

(Continued)

FOREIGN PATENT DOCUMENTS

JP 2009164743 A 7/2009

*Primary Examiner* — Negussie Worku
(74) *Attorney, Agent, or Firm* — Rossi, Kimms & McDowell LLP

(57) ABSTRACT

An image sensor unit includes a light condenser that collects light from an object to be read, an image sensor that receives the light collected by the light condenser and outputs an image, and a housing that houses the light condenser and the image sensor. The housing includes a plurality of spacer attachment portions to which a first spacer that keeps a distance between the housing and a mount member can be detachably attached and for which distances between the housing and the mount member in a state where the attached first spacer abuts against the mount member differ from each other.

10 Claims, 10 Drawing Sheets

(56) References Cited

U.S. PATENT DOCUMENTS

| | | | | |
|---|---|---|---|---|
| 2011/0279813 A1* | 11/2011 | Sugiyama | .............. | G02B 13/24 |
| | | | | 356/138 |
| 2013/0083371 A1* | 4/2013 | Osakabe | ................ | H04N 1/103 |
| | | | | 358/474 |
| 2013/0181311 A1* | 7/2013 | Sugiyama | .............. | H04N 1/193 |
| | | | | 257/432 |
| 2015/0341515 A1* | 11/2015 | Youda | ................ | H04N 1/00602 |
| | | | | 358/498 |
| 2018/0152584 A1* | 5/2018 | Sugiyama | .............. | H04N 1/047 |
| 2018/0309896 A1* | 10/2018 | Sugiyama | .......... | H04N 1/02855 |

* cited by examiner

F I G. 1
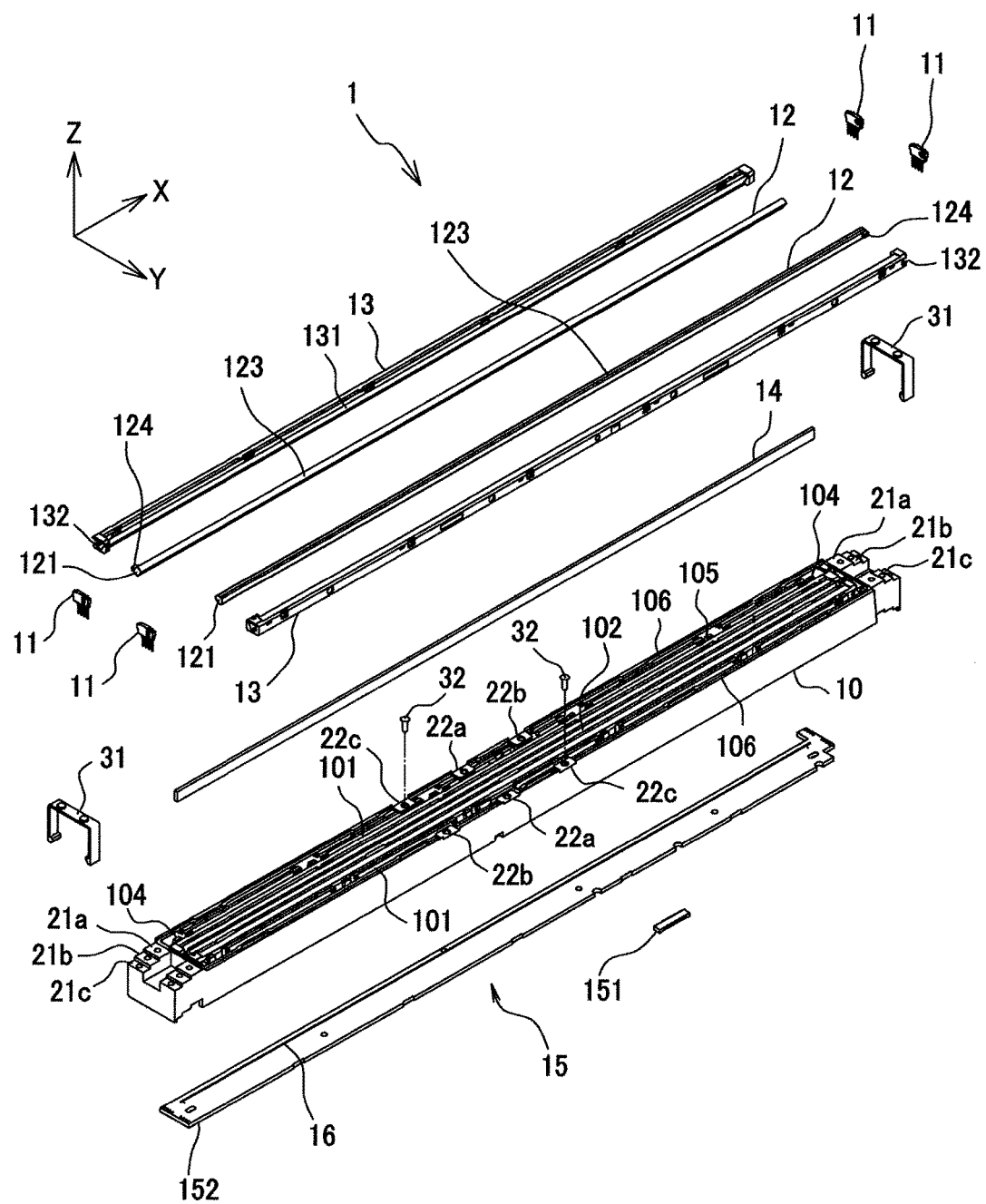

F I G. 7
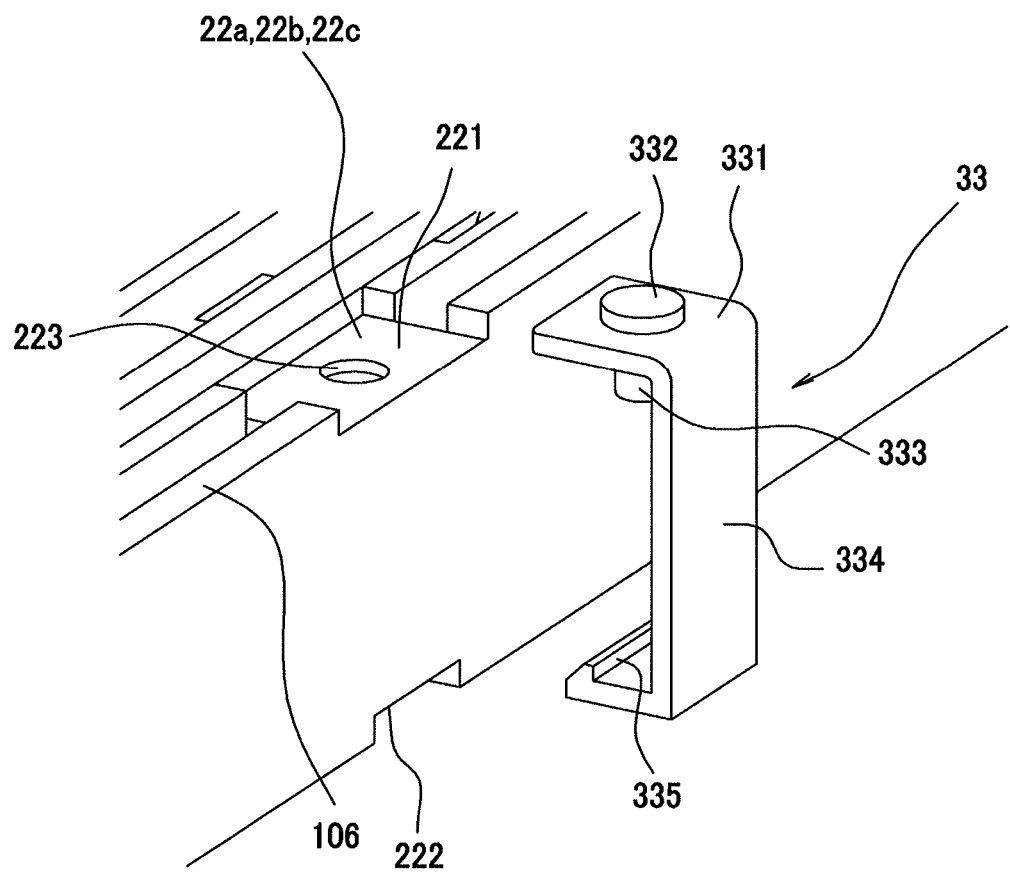

F I G. 8
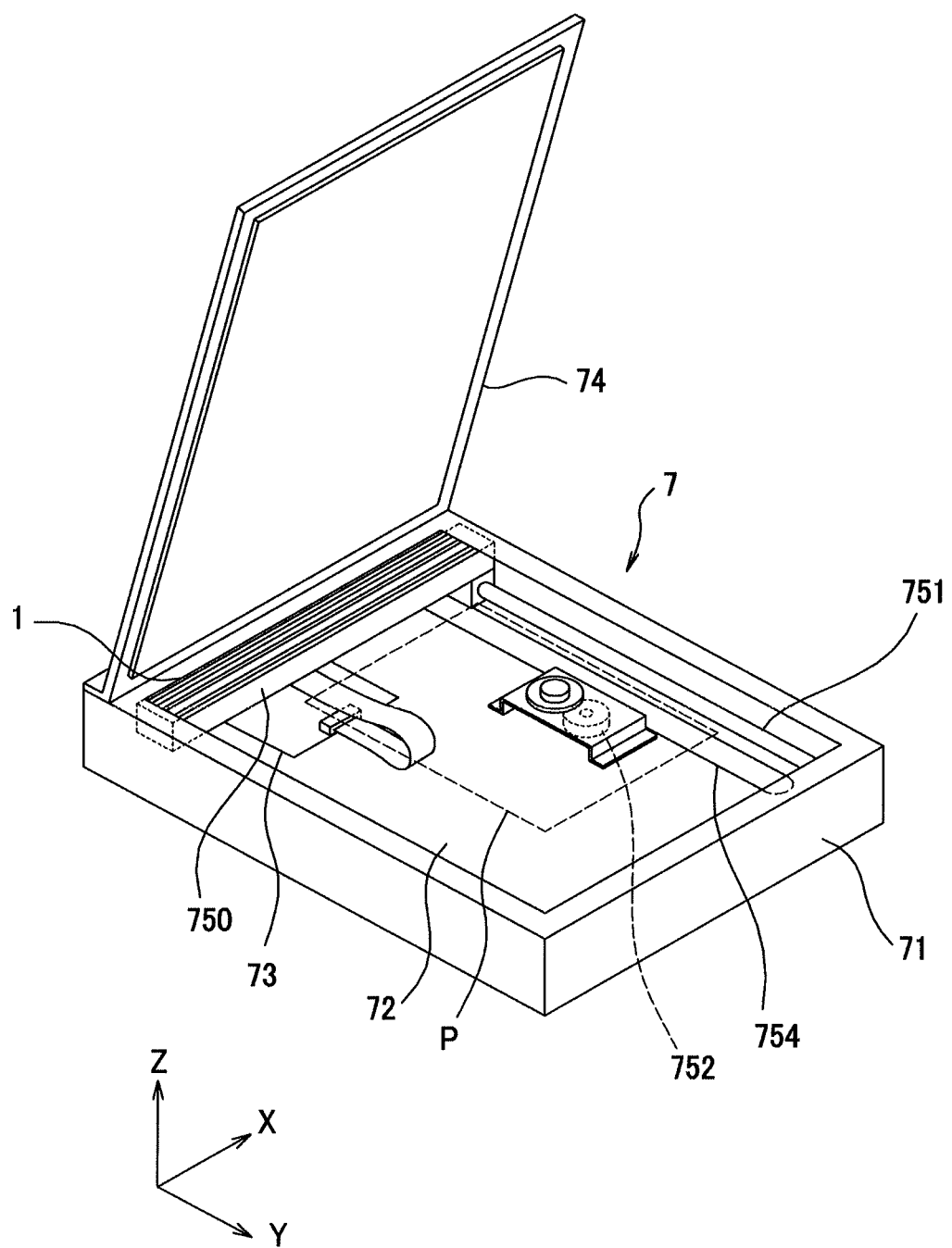

IMAGE SENSOR UNIT, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2016-233113, filed on Nov. 30, 2016, the entire contents of which are incorporated herein by reference.

BACKGROUND OF THE INVENTION

Field of the Invention

The present invention relates to an image sensor unit, an image reading apparatus, and an image forming apparatus.

Description of the Related Art

Some of image reading apparatuses such as scanners and image forming apparatuses such as copying machines or multifunction printers (MFPs) incorporate a contact image sensor. In such image reading apparatuses and image forming apparatuses, the contact image sensor reads an object to be read while relatively moving with respect to the object to be read. In this process, the distance between the contact image sensor and the object to be read is kept at a distance suitable for reading by a distance adjusting member provided in the contact image sensor. In general, the contact image sensor has a shallow depth of focus. Thus, the quality (such as resolution) of reading of an image by the contact image sensor is affected by the dimensional tolerance of each component of the contact image sensor. Thus, the resolution of reading varies (differs) between individual contact image sensors due to the dimensional tolerance of each component of the contact image sensor.

A possible configuration for adjusting the distance to the object to be read for each contact image sensor is a configuration in which a sheet-like member (distance adjusting member) of a predetermined thickness is interposed between a housing of the contact image sensor and a spacer (distance keeping member). With such a configuration, however, a plurality of types of sheet-like members of different thicknesses need to be prepared in advance. Thus, the types of the members involved in the adjustment of the distance to the object to be read increase.

As another configuration for adjusting the distance to the object to be read, Patent Document 1 discloses a configuration that involves a cam mechanism. With the configuration, the distance to the object to be read can be adjusted for each contact image sensor by rotation of a cam. With the configuration, however, the contact image sensor needs to have a region where the cam mechanism is provided, and the housing has an increased size. In addition, the number of components increases, and the structure is complicated, so that the manufacturing cost increases.

Patent Document 1: Japanese Laid-open Patent Publication No. 2009-164743

SUMMARY OF THE INVENTION

In view of circumstances described above, an object of the present invention is to reduce the types of members used for adjusting the distance to the object to be read.

The present invention provides an image sensor unit capable of reading an object to be read mounted on a mount member from a side of the mount member, comprising a light condenser that collects light from the object to be read, an image sensor that receives the light collected by the light condenser and converts the light into an electric signal, and a housing that houses the light condenser and the image sensor, and the housing includes a plurality of spacer attachment portions to which a spacer that keeps a distance between the housing and the mount member can be detachably attached and whose positions in a direction of an optical axis of the light condenser differ from each other.

BRIEF DESCRIPTION OF THE DRAWINGS

FIG. 1 is a schematic exploded perspective view showing a configuration example of an image sensor unit;

FIG. 7 is a schematic perspective view showing another configuration example of the second spacer and the second spacer attachment portions;

FIG. 8 is a schematic external perspective view showing a configuration example of an image reading apparatus;

DETAILED DESCRIPTION OF THE PREFERRED EMBODIMENTS

Figure 2:
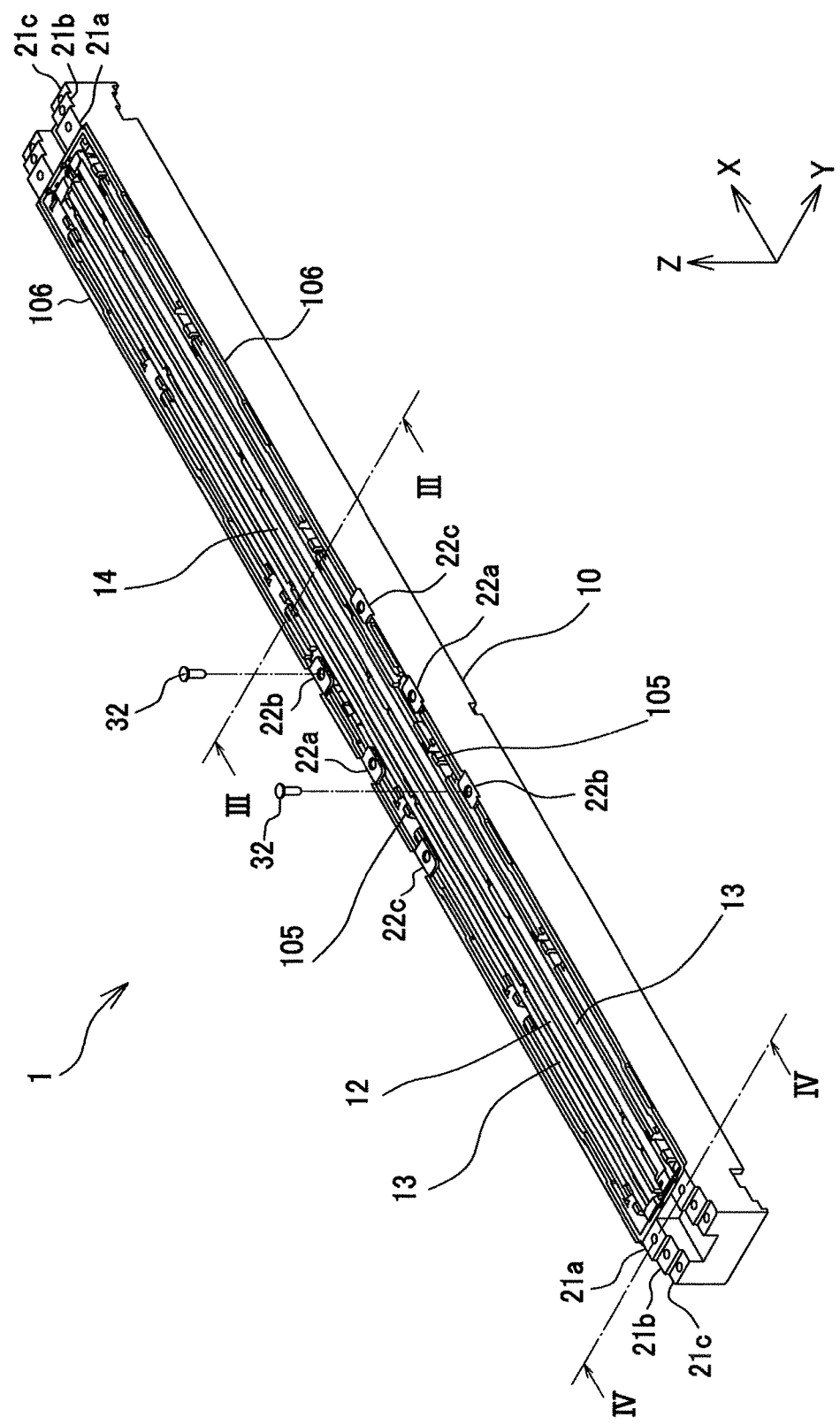
FIG. 2 is a schematic external perspective view showing the configuration example of the image sensor unit.

In the following, embodiments of the present invention will be described in detail with reference to the drawings. Embodiments of the present invention include an image sensor unit, and an image reading apparatus and an image forming apparatus that incorporate the image sensor unit. According to an embodiment of the present invention, the image sensor unit is a contact image sensor (CIS). The image sensor unit reads an object P to be read, such as a paper sheet, by emitting light to the object P to be read while moving at least one of the image sensor unit and the object P to be read and receiving the light reflected therefrom. As used herein, the term "light" means not only visible light but also electromagnetic waves in other wavelength bands than visible light, such as ultraviolet light and infrared light. In the drawings, three-dimensional directions concerning the image sensor unit are indicated by X, Y, and Z arrows. The X axis direction is the longitudinal direction of the image sensor unit and is a main-scan direction, for example. The Y axis direction is the direction of one of two orthogonal shorter dimensions of the image sensor unit and is a sub-scan direction, for example. The Z axis direction is the direction of the other of the two orthogonal shorter dimensions of the image sensor unit and is the vertical direction, for example. With regard to the vertical direction, it is assumed that the side of the image sensor unit that faces the object P to be read is the upper side, and the opposite side is the lower side.

(Configuration Example of Image Sensor Unit)

Figure 3:
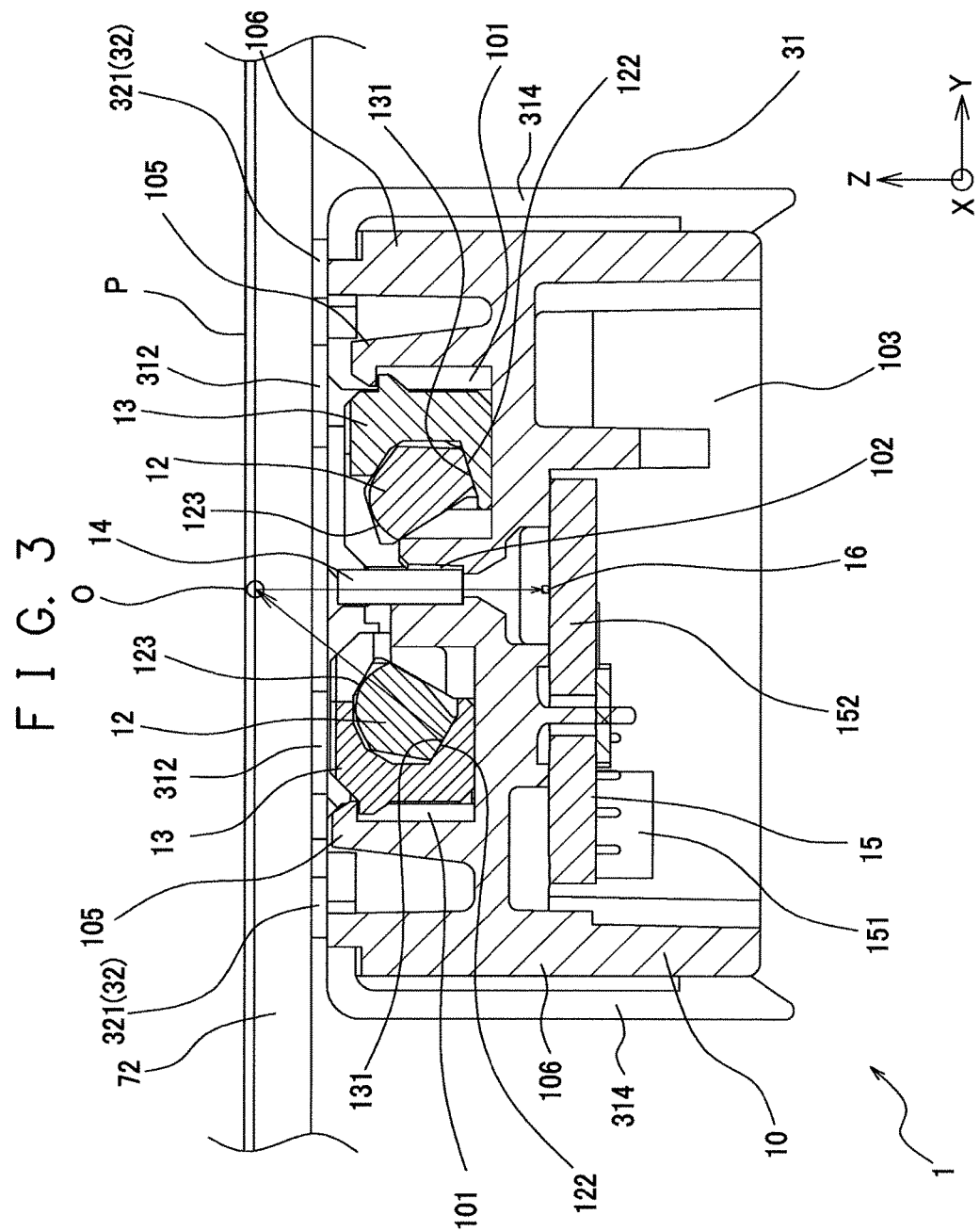
FIG. 3 is a cross-sectional view of the image sensor unit taken along a plane perpendicular to a longer dimension direction thereof.

First, a configuration example of an image sensor unit 1 will be described with reference to FIGS. 1 to 3. FIG. 1 is a schematic exploded perspective view showing a configuration example of the image sensor unit 1. FIG. 2 is a schematic external perspective view showing the configuration example of the image sensor unit 1. FIG. 3 is a cross-sectional view taken along the line III-III in FIG. 2, which shows a cross section taken along a plane perpendicular to the direction of a longer dimension (main-scan direction) of the image sensor unit 1. As shown in FIGS. 1 to 3, the image sensor unit 1 includes a housing 10, a light source 11, a light guide 12, a light guide cover 13, a light condenser 14, and a sensor substrate 15. The image sensor unit 1 further includes a first spacer 31 and a second spacer 32 for keeping a desired distance to the object P to be read.

The light source 11 may be any of various point light sources, such as an LED package including LED elements. For example, the light source 11 is an LED package including LED elements that emit light of different colors (wavelength ranges), such as red (R), green (G), blue (B) and infrared (Ir). However, the configuration of the light source 11 and the colors of the light emitted by the light source 11 are not particularly limited. For example, the light source 11 may be an LED package including LED elements that emit light of a single color (wavelength range). Furthermore, the light source 11 is not limited to the LED package.

The light guide 12 is an optical member that shapes the light emitted by the light source 11 into a line (converts the point light source into a line light source) and emits the resulting light to the outside of the image sensor unit 1 (on the side of the object P to be read). The light guide 12 is made of a transparent material, such as an acrylic resin, and generally has an elongated rod-like shape. On one or both of the end faces of the light guide 12 in the longer dimension direction (main-scan direction), the light guide 12 has a light incident surface 121 on which the light emitted by the light source 11 is incident. In the configuration example shown in FIGS. 1 and 2, the light incident surfaces 121 are formed on both end faces. On a side face of the light guide 12, a light diffusing surface 122 (see FIG. 3) and a light emission surface 123 described later are provided. The light guide 12 has an engaging portion 124 that positions the light guide 12 with respect to the light guide cover 13. The engaging portion 124 may be a protrusion that is provided at an end of the light guide 12 in the longer dimension direction and protrudes in a shorter dimension direction (for example, the sub-scan direction), for example.

The light diffusing surface 122 of the light guide 12 is a surface that diffuses the light received through the light incident surface 121 and has an elongated shape. On the light diffusing surface 122, for example, a prism pattern that emits light to the outside of the light guide 12 is formed (not shown). The prism pattern may be a structure that has a substantially triangular cross section and extends in a direction perpendicular to the longitudinal direction (main-scan direction). Alternatively, a dot pattern for diffusing light may be printed on the light diffusing surface 122. The light emission surface 123 is a surface that emits the light received through the light incident surface 121 toward the object P to be read. The light emission surface 123 has an elongated shape and extends in the longer dimension direction of the light guide 12 so as to shape the light emitted by the light source 11 into a line (convert the light source 11 into a line light source).

Although the drawings show an arrangement in which the light incident surfaces 121 are provided on both end faces of the light guide 12 in the longer dimension direction (main-scan direction), the light incident surface 121 may be provided only one of the end faces. Although the drawings show an arrangement in which the image sensor unit 1 includes two light guides 12, the number of the light guides 12 of the image sensor unit 1 is not particularly limited. For example, the image sensor unit 1 may include one light guide 12 or include three or more light guides 12.

The light guide cover 13 is a member attached to the light guide 12 and has the shape of an elongated rod that extends in the longer dimension direction and has a substantially U-shaped or C-shaped cross section taken along a plane perpendicular to the longer dimension direction. The light guide cover 13 has a function of diffusing light and a function of improving the efficiency of light utilization. To serve such functions, the light guide cover 13 is made of a material that has a high reflectance, such as polycarbonate mixed with titanium oxide powder. A light reflection surface 131 is provided on the inner side of the light guide cover 13. The light reflection surface 131 is a surface that reflects the light emitted to the outside from the light diffusing surface 122 of the light guide 12 back into the light guide 12, and has an elongated shape that extends in the longer dimension direction of the light guide 12 as with the light diffusing surface 122 of the light guide 12. The light reflection surface 131 may be formed by a part or the whole of the inner surface of the light guide cover 13. Once the light guide cover 13 is attached to the light guide 12, the light reflection surface 131 of the light guide cover 13 covers the light diffusing surface 122 of the light guide 12 (the light reflection surface 131 provided on the light guide cover 13 faces the light diffusing surface 122 provided on the side surface of the light guide 12).

An engagement portion 132 with which the engaging portion 124 of the light guide 12 can be engaged is provided in the vicinity of an end of the light guide cover 13 in the longer dimension direction. If the engaging portion 124 of the light guide 12 is a protrusion, the engagement portion 132 provided on the light guide cover 13 is an opening or recess into which the engaging portion 124 can be fitted, for example. Once the engaging portion 124 of the light guide 12 is engaged with the engagement portion 132 of the light guide cover 13, the light guide 12 and the light guide cover 13 are kept in the state where they are positioned with respect to each other.

The light condenser 14 is an optical member that focuses the light from the object P to be read onto a surface of an image sensor 16 (described later). The light condenser 14 may be a common rod-lens array (micro-lens array), for example. The common rod-lens array includes a plurality of imaging elements (rod-lenses) of an erect equal magnification imaging type linearly arranged in the longer dimension direction. The light condenser 14 is not limited to any specific configuration.

The sensor substrate 15 has a wiring board 152 and the image sensor 16 and the light source 11 provided on the wiring board 152. The sensor substrate 15 may also have a connector 151 to electrically connect to the outside. Viewed in the vertical direction, the wiring board 152 has an elongated shape (a substantially rectangular shape, for example). The wiring board 152 is not limited to any particular configuration and may be any of well-known wiring boards, such as a printed wiring board.

The image sensor 16 receives the light focused by the light condenser 14 (light from the object P to be read) and converts the light into an electrical signal. The image sensor 16 has a plurality of photoelectric conversion elements linearly (one-dimensionally) arranged. For example, the image sensor 16 may be an image sensor IC array. The image sensor IC array has a plurality of image sensor ICs, which are linearly arranged in the longer dimension direction (main-scan direction) on an upper surface of the wiring board 152. Each image sensor IC has a plurality of photoelectric conversion elements (referred to also as a light receiving element) linearly (one-dimensionally) arranged. The image sensor 16 is not limited to any specific configuration, as far as the image sensor 16 has a plurality of photoelectric conversion elements linearly (one-dimensionally) arranged. For example, the number of, or the interval between, the plurality of photoelectric conversion elements included in the image sensor 16 can be appropriately determined depending on the specifications of the image sensor unit 1. When the image sensor IC array is used as the image sensor 16, the configuration of the image sensor ICs forming the image sensor IC array is also not particularly limited, and any of various well-known image sensor ICs can be used. Furthermore, when the image sensor IC array is used as the image sensor 16, the image sensor ICs may be arranged in a plurality of rows in a staggered manner.

The housing 10 is a housing of the image sensor unit 1. The housing 10 is made of a light-blocking material, for example. For example, the material of the housing 10 may be any of various resin materials, such as polycarbonate colored black. Viewed in the vertical direction, the housing 10 has a substantially rectangular shape elongated in a predetermined direction (main-scan direction). The housing 10 includes a light guide housing portion 101, a light condenser housing portion 102, a sensor substrate housing portion 103, and a light source housing portion 104. The light guide housing portion 101 is a portion capable of housing the light guide 12 with the light guide cover 13 attached thereto. The light condenser housing portion 102 is a portion capable of housing the light condenser 14. The sensor substrate housing portion 103 is a portion that houses the sensor substrate 15. The housing 10 further includes a plurality of first spacer attachment portions 21a to 21c to which first spacers 31 can be detachably attached and a plurality of second spacer attachment portions 22a to 22c to which second spacers 32 can be detachably attached. The housing 10 includes two side walls 106 that extend in parallel with each other in the longer dimension direction (main-scan direction) of the housing 10 at both ends of the housing 10 in one of the two orthogonal shorter dimension directions (sub-scan direction). According to this embodiment of the present invention, upper surfaces of the two side walls 106 are substantially planar and positioned at the uppermost end (top) of the housing 10.

The light guide housing portion 101 is a portion capable of housing the light guide 12 with the light guide cover 13 attached thereto. The light guide housing portion 101 is provided toward the top of the housing 10 and is open at the top, the opening being elongated in the longer dimension direction of the housing 10. A holding piece 105 is provided on one side of the light guide housing portion 101 in the sub-scan direction. The holding piece 105 is an elastically deformable tongue-like structure and biases the light guide 12 with the light guide cover 13 attached thereto housed in the light guide housing portion 101 toward the opposite side in the sub-scan direction and downward in the vertical direction.

The light condenser housing portion 102 is a portion capable of housing the light condenser 14. The light condenser housing portion 102 is provided toward the top of the housing 10 and is elongated in the longer dimension direction (main-scan direction) of the housing 10 and is open at both the top and bottom thereof. The opening at the bottom (lower side) of the light condenser housing portion 102 is in communication with the sensor substrate housing portion 103 described later.

When the image sensor unit 1 includes one light condenser 14 and two light guides 12 as shown in FIGS. 1 and 2, the housing 10 includes one light condenser housing portion 102 and two light guide housing portions 101. In this case, as shown in FIG. 1, the one light condenser housing portion 102 is provided between the two light guide housing portions 101. When the image sensor unit 1 includes one light condenser 14 and one light guide 12, the one light condenser housing portion 102 and one light guide housing portion 101 are provided side by side.

The sensor substrate housing portion 103 is a portion capable of housing the sensor substrate 15. As shown in FIG. 3, the sensor substrate housing portion 103 is provided toward the bottom of the housing 10 (more specifically, below the light guide housing portion 101, the light condenser housing portion 102 and the light source housing portion 104) and is open at the bottom.

The light source housing portion 104 is a portion capable of housing the light source 11. Light source housing portions 104 are provided in the vicinity of the opposite ends in the longer dimension direction of the housing 10 on the outer sides of the light guide housing portion 101 in the longer dimension direction. The light source housing portions 104 are in communication with the light guide housing portion 101 and with the sensor substrate housing portion 103.

On each of the opposite ends (one end and the other end) in the longer dimension direction (main-scan direction) of the housing 10, a plurality of first spacer attachment portions 21a to 21c to which the first spacers 31 can be detachably attached is provided on the outer side of the light guide housing portion 101 and the light source housing portion 104 in the longer dimension direction. On each of the two side walls 106 of the housing 10 (the side walls 106 that are provided on the ends in the shorter dimension direction of the housing 10 and extend in the longer dimension direction of the housing 10), a plurality of second spacer attachment portions 22a to 22c to which the second spacers 32 can be detachably attached are provided in a middle part in the longer dimension direction of the housing 10 (between the first spacer attachment portions 21a to 21c on the opposite ends in the longer dimension direction). Configuration examples of the first spacer 31, the plurality of first spacer attachment portions 21a to 21c, the second spacer 32 and the plurality of second spacer attachment portions 22a to 22c will be described later.

Next, a structure of the assembled image sensor unit 1 will be described.

The light guide 12 with the light guide cover 13 attached thereto is housed in the light guide housing portion 101. Once the light guide 12 with the light guide cover 13 attached thereto is housed in the light guide housing portion 101, the holding piece 105 provided on the housing 10 biases the light guide 12 and the light guide cover 13 toward one side in the sub-scan direction and downward. Thus, the biased light guide 12 abuts against the inner surface on one side in the sub-scan direction and the bottom surface of the light guide housing portion 101. Thus, once the light guide 12 is housed in the light guide housing portion 101, the light guide 12 is positioned in the sub-scan direction and the vertical direction with respect to the housing 10.

The light condenser 14 is housed in the light condenser housing portion 102 with the optical axis thereof being in parallel with the vertical direction. The light condenser 14 housed in the light condenser housing portion 102 is bonded and fixed to the housing 10 by an ultraviolet curable adhesive, for example. In the state where the image sensor unit 1 is assembled in an image reading apparatus or an image forming apparatus, an upper focal point of the light condenser 14 is set above an upper end face of the housing 10 so as to be located on the surface to be read of the object P to be read. The distance from the upper end face of the housing 10 of the image sensor unit 1 to the upper focal point of the light condenser 14 can be appropriately determined depending on the configuration (such as specifications) of the image sensor unit 1 or the configuration (such as specifications) of the image reading apparatus or image forming apparatus in which the image sensor unit 1 is incorporated, and is not particularly limited.

The sensor substrate 15 is housed in the sensor substrate housing portion 103. In that state, the image sensor 16 provided on the upper surface of the sensor substrate 15 is located on the optical axis of the light condenser 14 housed in the light condenser housing portion 102. Each of the plurality of photoelectric conversion elements of the image sensor 16 is located at a lower focal point of the light condenser 14 housed in the light condenser housing portion 102.

The light source 11 is housed in the light source housing portion 104. The light source housing portion 104 and the light guide housing portion 101 are connected to each other, and the light source 11 housed in the light source housing portion 104 can illuminate the light incident surface 121 of the light guide 12 housed in the light guide housing portion 101. In addition, the light source 11 is electrically connected to and physically bonded to the wiring board 152 of the sensor substrate 15 housed in the sensor substrate housing portion 103.

(Reading Operation of Image Sensor Unit)

Next, an example of a reading operation of the image sensor unit 1 to read the object P to be read will be described. In the state where the image sensor unit 1 is incorporated in the image reading apparatus or the image forming apparatus, a transparent planar member, such as a platen glass, on which the object P to be read is to be mounted (referred to as a mount member 72 (see FIGS. 8 and 9), hereinafter) is arranged above the image sensor unit 1. The image sensor unit 1 reads the object P to be read mounted on an upper surface of the mount member 72.

The light source 11 sequentially turns on light emitting elements of different colors. The light emitted by the light source 11 enters the light guide 12 through the light incident surfaces 121 provided on the opposite end faces of the light guide 12. The light that has entered the light guide 12 and reached the light emission surface 123 is emitted toward a reading line O for the object P to be read from the light emission surface 123. The light that has entered the light guide 12 and reached the light diffusing surface 122 is emitted to the outside from the prism pattern provided on the light diffusing surface 122. Since the light diffusing surface 122 of the light guide 12 is covered with (faces) the light reflection surface 131 of the light guide cover 13, the light emitted from the prism pattern to the outside is diffuse-reflected by the light reflection surface 131 of the light guide cover 13 and enters again the light guide 12 through the light diffusing surface 122 of the light guide 12. The light entering the light guide 12 again is emitted toward the reading line O for the object P to be read from the light emission surface 123.

The light reflected from the object P to be read passes through the light condenser 14 housed in the light condenser housing portion 102 and is focused on the image sensor 16 provided on the upper surface of the sensor substrate 15. The image sensor 16 converts the incident light into an electrical signal and output the electrical signal. The image sensor unit 1 performs the operation described above while relatively moving in the sub-scan direction with respect to the object P to be read (by moving the image sensor unit 1 in the sub-scan direction with respect to the object P to be read, by moving the object P to be read in the sub-scan direction with respect to the image sensor unit 1, or moving the image sensor unit 1 and the object P to be read in the sub-scan direction). In this way, the image sensor unit 1 can read the object P to be read.

When the image sensor unit 1 reads the object P to be read, the upper focal point of the light condenser 14 is preferably located on the lower surface (the surface on the side to face the image sensor unit 1) of the object P to be read. For example, if the upper focal point of the light condenser 14 and the lower surface of the object P to be read are displaced in the direction of the optical axis of the light condenser 14 (the vertical direction in this example), the image sensor unit 1 outputs an out-of-focus image (blurred image). In this embodiment of the present invention, the upper focal point of the light condenser 14 can be kept on the lower surface of the object P to be read by the first spacer attachment portions 21a to 21c, the second spacer attachment portions 22a to 22c, the first spacers 31 and the second spacers 32 described below. Furthermore, the relative positional relationship between the upper focal point of the light condenser 14 and the upper surface of the mount member 72 can be changed with the first spacer attachment portions 21a to 21c, the second spacer attachment portions 22a to 22c, the first spacers 31 and the second spacers 32.

(First Spacer and First Spacer Attachment Portion)

Figure 4:
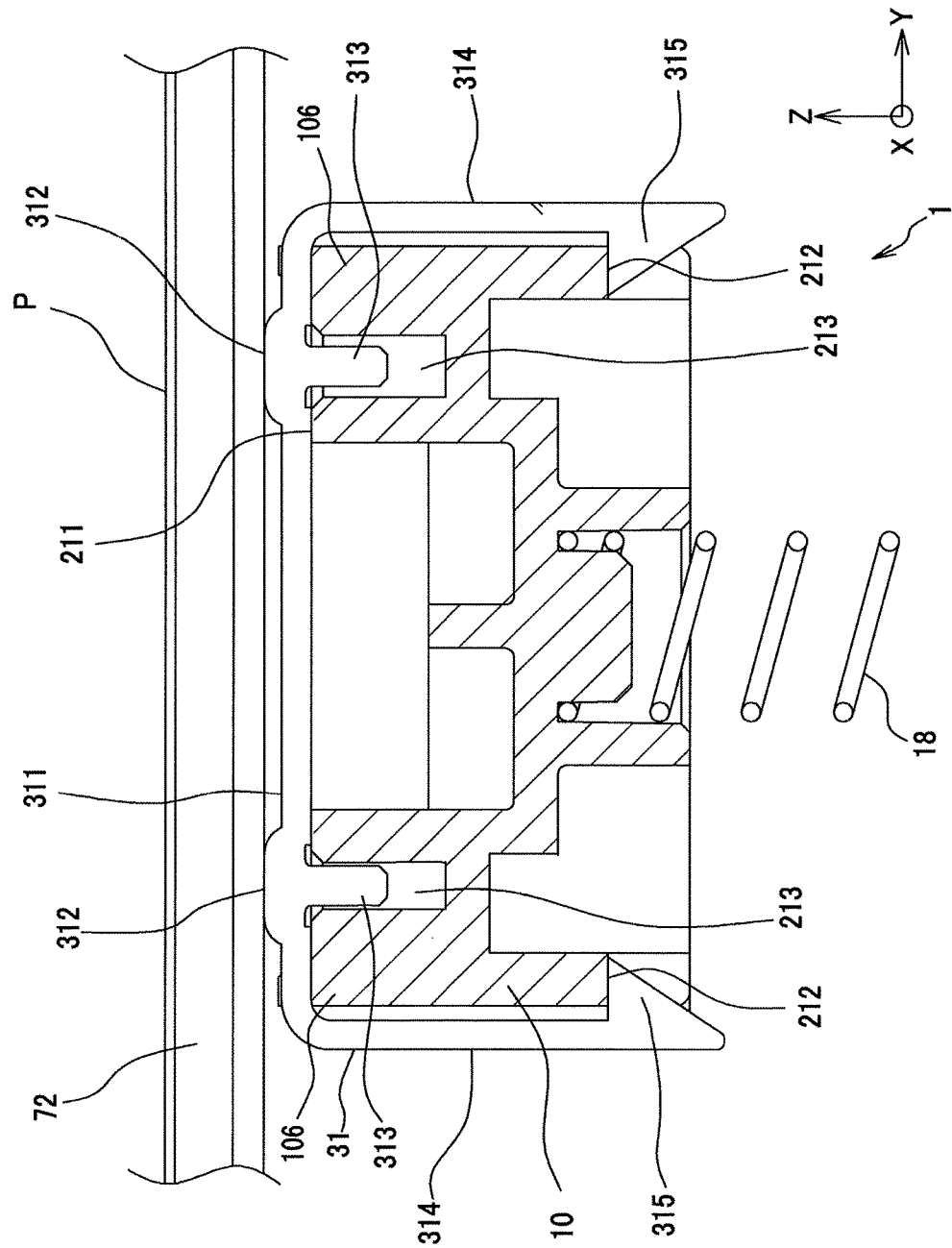
FIG. 4 is a schematic cross-sectional view showing a first spacer attached to one of a plurality of first spacer attachment portions.
Figure 5:
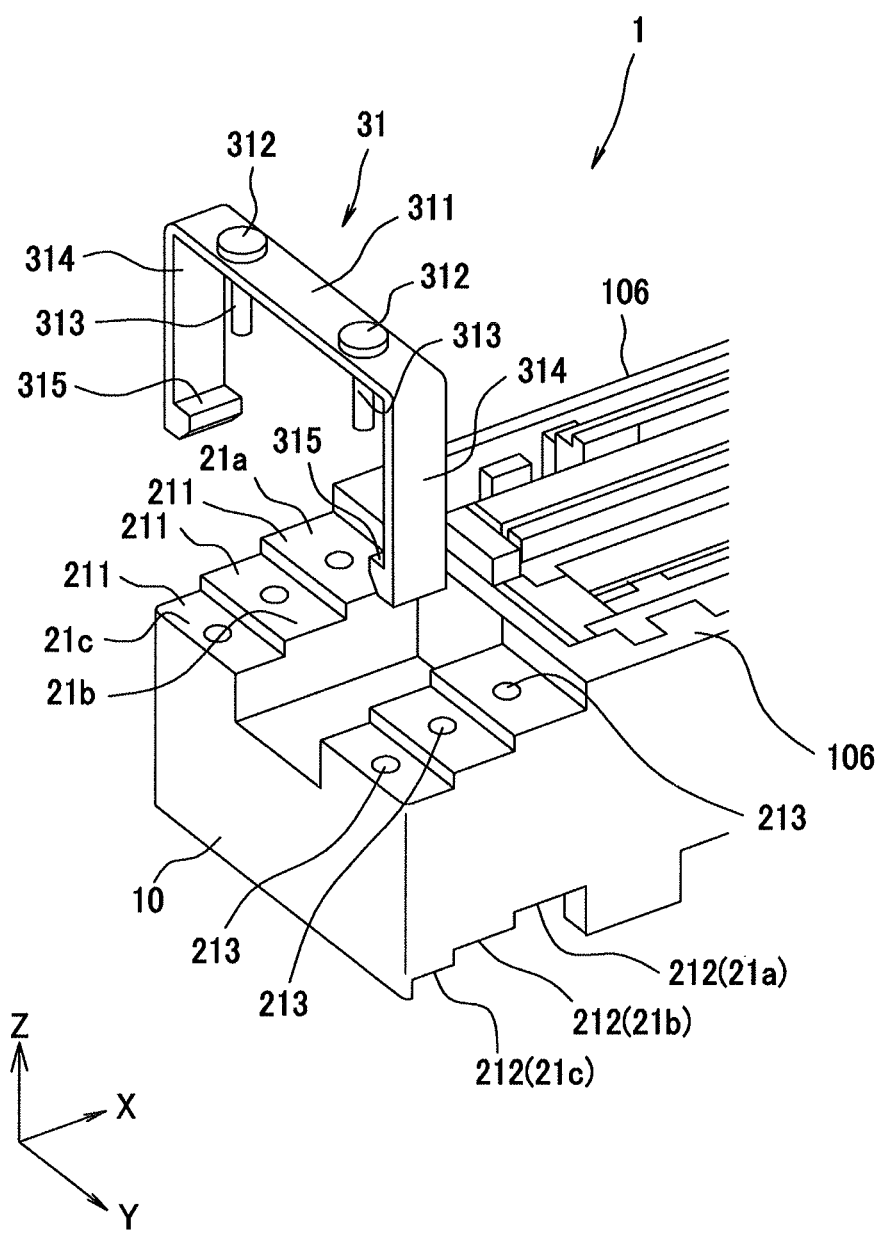
FIG. 5 is a schematic perspective view showing a configuration example of the first spacer and the first spacer attachment portions.

Next, a configuration example of the first spacer 31 and the first spacer attachment portions 21a to 21c will be described with reference to FIGS. 4 and 5. FIG. 4 is a cross-sectional view taken along the line IV-IV in FIG. 1 and schematically shows one first spacer 31 attached to a plurality of first spacer attachment portions 21a to 21c. FIG. 5 is a schematic perspective view showing a configuration example of the first spacer 31 and the first spacer attachment portions 21a to 21c.

The first spacer 31 is configured to be capable of being attached to and detached from the plurality of first spacer attachment portions 21a to 21c provided on each of the opposite ends in the longer dimension direction of the housing 10. In the state where the first spacer 31 is attached to any one of the plurality of first spacer attachment portions 21a to 21c, the uppermost end of the first spacer 31 (the upper end of an abutment portion 312 described later in this embodiment of the present invention) is located above the uppermost end of the housing 10 (the upper surfaces of the two side walls 106 in this embodiment of the present invention). In the state where the image sensor unit 1 is incorporated in an image reading apparatus 7 or an image forming apparatus 9, the uppermost end of the first spacer 31 abuts against the lower surface of the mount member 72. In this way, a desired distance is kept between the mount member 72 and the light condenser 14, and the upper focal point of the light condenser 14 is kept on the upper surface of the mount member 72 (the lower surface of the object P to be read) (see FIG. 4).

The housing 10 includes a plurality of sets of pairs of first spacer attachment portions 21a to 21c. The first spacer 31 can be detachably attached to each of the first spacer attachment portions 21a to 21c. In this embodiment of the present invention, paired two first spacer attachment portions 21a, 21b, 21c are configured so that the vertical positions of the uppermost ends of the first spacers 31 attached thereto (the vertical distances from the uppermost end of the housing 10 to the uppermost ends of the first spacers 31 attached thereto) are the same. The vertical position of the uppermost end of the first spacer 31 varies with the pair of first spacer attachment portions to which the first spacer 31 is attached. At each of one end and the other end in the longer dimension direction of the housing 10, one set of pairs of first spacer attachment portions 21a to 21c is provided. Thus, at each of the opposite ends in the longer dimension direction of the housing 10, a plurality of first spacer attachment portions 21a to 21c, on which the uppermost end of the attached first spacer 31 is located at different vertical positions, is provided.

In this embodiment of the present invention, sets of three pairs of first spacer attachment portions 21a to 21c are provided, for example. In this case, at each of the opposite ends in the longer dimension direction of the housing 10, three pairs of first spacer attachment portions 21a to 21c are provided. The three pairs of first spacer attachment portions 21a to 21c provided at each of the opposite ends in the longer dimension direction of the housing 10 differ in distance from the upper end of the housing 10 to the uppermost end of the first spacer 31 attached thereto.

The number of pairs of the first spacer attachment portions provided on the housing 10 is not limited to three. Two pairs of first spacer attachment portions or four or more pairs of first spacer attachment portions are also possible. At each of the opposite ends in the longer dimension direction of the housing 10, the same number of first spacer attachment portions as the number of pairs are provided.

With such a configuration, two first spacers 31 can be selectively attached to paired two first spacer attachment portions 21a, 21b, 21c to change the vertical distance between the uppermost ends of the first spacers 31 and the upper end face of the housing 10. Thus, in the state where the image sensor unit 1 is incorporated in the image reading apparatus 7 or the image forming apparatus 9 described later, the vertical position of the upper focal point of the light condenser 14 can be changed so as to position the upper focal point of the light condenser 14 on the upper surface of the mount member 72.

As described above, one set of pairs of first spacer attachment portions 21a to 21c is provided at each of the opposite ends in the longer dimension direction of the housing 10. Thus, once two first spacers 31 are attached to paired two first spacer attachment portions 21a, 21b, 21c, one first spacer 31 is attached to each of the opposite ends in the longer dimension direction of the housing 10. With such a configuration, when the uppermost ends of the first spacers 31 abut against the lower surface of the mount member 72, the housing 10 is not inclined with respect to the mount member 72 but is kept in parallel to the mount member 72.

As shown in FIGS. 4 and 5, the first spacer 31 has a main body portion 311 and a holding portion 314. The first spacer 31 is made of a resin material, for example, and the main body portion 311 and the holding portion 314 are integrally formed by injection molding.

The main body portion 311 has a plate-like or rod-like shape and has a predetermined dimension in the vertical direction. For example, the main body portion 311 may have a planar or a square rod-like shape that is elongated in the sub-scan direction. However, the main body portion 311 is not limited to any specific shape. The main body portion 311 can have any dimensions and shape as far as the main body portion 311 can be mounted on a supporting portion 211 of each of the plurality of first spacer attachment portions 21a to 21c described later.

The abutment portion 312 that protrudes upward may be provided on an upper surface of the main body portion 311. The abutment portion 312 is a portion to abut against the lower surface of the mount member 72 when the image sensor unit 1 is incorporated in the image reading apparatus 7 or the image forming apparatus 9. In this case, the upper end of the abutment portion 312 forms the uppermost end (uppermost portion) of the first spacer 31 and abuts against the lower surface of the mount member 72. For example, the abutment portion 312 may have a columnar or semispherical shape that protrudes upward from the upper surface of the main body portion 311. The number and shape of the abutment portions 312 is not particularly limited. The abutment portion 312 may not be provided on the main body portion 311. In that case, the upper surface of the main body portion 311 forms the uppermost end (uppermost portion) of the first spacer 31 and abuts against the lower surface of the mount member 72.

A positioning portion 313 that positions the main body portion 311 on the first spacer attachment portion 21a, 21b or 21c (or prevents the main body portion 311 from coming off the first spacer attachment portion 21a, 21b or 21c) may be provided on a lower surface of the main body portion 311. In the example shown in FIGS. 4 and 5, the positioning portion 313 is a protrusion that protrudes downward from the lower surface of the main body portion 311. However, the configuration of the positioning portion 313 is not particularly limited. The positioning portion 313 may not be provided on the main body portion 311. Although the dimension in the vertical direction (thickness) of the main body portion 311 is not limited to any specific value, the dimension is determined so that the uppermost end (the upper surface of the main body portion 311 or the upper end of the abutment portion 312) protrudes upward beyond the uppermost end of the housing 10 when the first spacer 31 is attached to the one of the plurality of first spacer attachment portions 21a to 21c that is the lowest in the vertical direction.

The holding portion 314 is a portion to keep the first spacer 31 in the state where the first spacer 31 is attached to the first spacer attachment portion 21a, 21b or 21c. The holding portion 314 has a rod-like or plate-like structure that is elastically deformable in the sub-scan direction, and holding portions 314 extend downward from the opposite ends in the sub-scan direction of the main body portion 311. Thus, viewed in the longer dimension direction of the image sensor unit 1, the first spacer 31 generally has a substantially inverted-U shape. A locking portion 315 is provided at a tip end of the holding portion 314. For example, locking portions 315 protruding from the opposed surfaces of the two holding portions 314 in the sub-scan direction can be used. However, the locking portion 315 is not limited to any specific configuration, as far as the locking portion 315 can be engaged with a locking counterpart 212 of the first spacer attachment portion 21a, 21b or 21c.

Each of the plurality of first spacer attachment portions 21a to 21c has the supporting portion 211 on which the main body portion 311 of the first spacer 31 can be mounted (supported) and the locking counterpart 212 with which the locking portion 315 can be engaged. The supporting portion 211 is a planar portion facing upward, for example. If the main body portion 311 of the first spacer 31 has the protrusion-like positioning portion 313, a positioning recess 213 into which the positioning portion 313 of the first spacer 31 can be inserted is provided on the supporting portions 211 of the first spacer attachment portions 21a to 21c. The supporting portion 211 is not limited to any specific configuration, as far as the main body portion 311 of the first spacer 31 (that is, at least a part of the first spacer 31) can be mounted on the supporting portion 211. The locking counterpart 212 may be a recess formed in a side surface of the housing 10 or a notch formed in the lower surface of the housing 10, for example. The locking counterpart 212 is not limited to any specific configuration, as far as the locking portion 315 of the first spacer 31 can be engaged with the locking counterpart 212.

The plurality of first spacer attachment portions 21a to 21c differ in vertical position of the supporting portion 211 (more specifically, the vertical distance (distance in the direction of the optical axis of the light condenser 14) from the uppermost end of the housing 10 (upper surface of the side wall 106)) so that the uppermost end of the first spacer 31 attached thereto is located at different positions. If the vertical positions of the supporting portion 211 (positions in the direction of the optical axis of the light condenser 14) differ between the first spacer attachment portions, the vertical positions of the main body portion 311 of the first spacer 31 attached to the first spacer attachment portions also differ, so that the vertical positions of the uppermost end of the first spacer 31 attached to the first spacer attachment portions also differ. However, the plurality of first spacer attachment portions 21a to 21c provided at each of the opposite ends in the longer dimension direction of the housing 10 have the same configuration except that the vertical positions of the locking counterparts 212 of the supporting portions 211. That is, the first spacer 31 having the same configuration can be attached to the plurality of first spacer attachment portions 21a to 21c. In other words, the same first spacer 31 can be attached to any of the plurality of first spacer attachment portions 21a to 21c. In addition, the vertical positions of the supporting portions 211 of the paired two first spacer attachment portions 21a, 21b, 21c are the same. Thus, in the state where the first spacers 31 are attached to the paired two first spacer attachment portions 21a, 21b, 21c, the vertical positions of the uppermost ends of the two first spacers 31 are the same.

The plurality of first spacer attachment portions 21a to 21c the vertical positions of the supporting portions 211 of which differ from each other are arranged side by side in the longer dimension direction at each of the opposite ends in the longer dimension direction of the housing 10. In the example shown in FIGS. 4 and 5, three first spacer attachment portions 21a to 21c the vertical positions of the supporting portions 211 of which differ from each other are provided at each of the opposite ends in the longer dimension direction of the housing 10. In this example, in addition, the first spacer attachment portion 21a, the vertical position of the supporting portion 211 of which is the highest (located at the uppermost position), is provided at a position closest to the center in the longer dimension direction. The first spacer attachment portion 21b, the vertical position of the supporting portion 211 of which is the second highest, is provided adjacent to the first spacer attachment portion 21a, the vertical position of the supporting portion 211 of which is the highest, on the outer side of the first spacer attachment portion 21a in the longer dimension direction. The first spacer attachment portion 21c, the vertical position of the supporting portion 211 of which is the lowest (located at the lowermost position), is provided at a position closest to the end in the longer dimension direction. In this way, two first spacer attachment portions 21a, 21b, 21c having the same vertical position are provided line-symmetrically (mirror-symmetrically) with respect to the housing 10. With such a configuration, each of the opposite ends in the longer dimension direction of the housing 10 has a step-like shape and becomes lower stepwise as it goes toward the end in the longer dimension direction.

The arrangement of the plurality of first spacer attachment portions 21a to 21c is not limited to the arrangement described above. Any arrangement is possible as far as the plurality of first spacer attachment portions 21a to 21c the vertical positions of the supporting portions 211 of which differ from each other are provided at each of the opposite ends in the longer dimension direction of the housing 10.

The first spacer 31 can be detachably attached to the plurality of first spacer attachment portions 21a to 21c. Once the first spacer 31 is attached to any of the plurality of first spacer attachment portions 21a to 21c, the main body portion 311 of the first spacer 31 is mounted on the upper surface of the supporting portion 211 of the first spacer attachment portion 21a, 21b or 21c, and the two holding portions 314 of the first spacer 31 hold the housing 10 at the opposite outer sides thereof in the sub-scan direction. And the locking portions 315 of the first spacer 31 are engaged with (fitted in) the locking counterparts 212 of the first spacer attachment portion 21a, 21b or 21c. In this way, the first spacer 31 is kept in the state where the first spacer 31 is attached to the first spacer attachment portion 21a, 21b or 21c. In addition, the positioning portions 313 provided on the main body portion 311 of the first spacer 31 are fitted in the positioning recesses 213 in the first spacer attachment portion 21a, 21b or 21c, thereby keeping the main body portion 311 of the first spacer 31 in the positioned state and preventing the main body portion 311 of the first spacer 31 from coming off the supporting portion 211 of the first spacer attachment portion 21a, 21b or 21c. To remove the first spacer 31, the holding portions 314 can be elastically deformed outward in the sub-scan direction to disengage the locking portions 315 from the locking counterparts 212. Since the plurality of first spacer attachment portions 21a to 21c have the same configuration, one first spacer 31 can be attached to any one of the plurality of first spacer attachment portions 21a to 21c. In this way, the first spacer 31 can be detachably attached to the plurality of first spacer attachment portions 21a to 21c.

In the state where the first spacer 31 is attached to the first spacer attachment portion 21a, 21b or 21c, the vertical distance from the uppermost end of the housing 10 (the upper surface of the side wall 106) to the uppermost end of the first spacer 31 differs between the first spacer attachment portions 21a to 21c to which the first spacer 31 is attached. Thus, the vertical distance from the uppermost end of the housing 10 to the uppermost end of the first spacer 31 can be changed stepwise by selectively attaching the first spacer 31 to any one of the plurality of first spacer attachment portions 21a to 21c. Thus, in the state where the image sensor unit 1 is incorporated in the image reading apparatus 7 or the image forming apparatus 9, the position of the upper focal point of the light condenser 14 (in particular, the relative positional relationship between the upper focal point of the light condenser 14 and the upper surface of the mount member 72) can be changed stepwise (see FIG. 5).

(Second Spacer and Second Spacer Attachment Portion)

Figure 6:
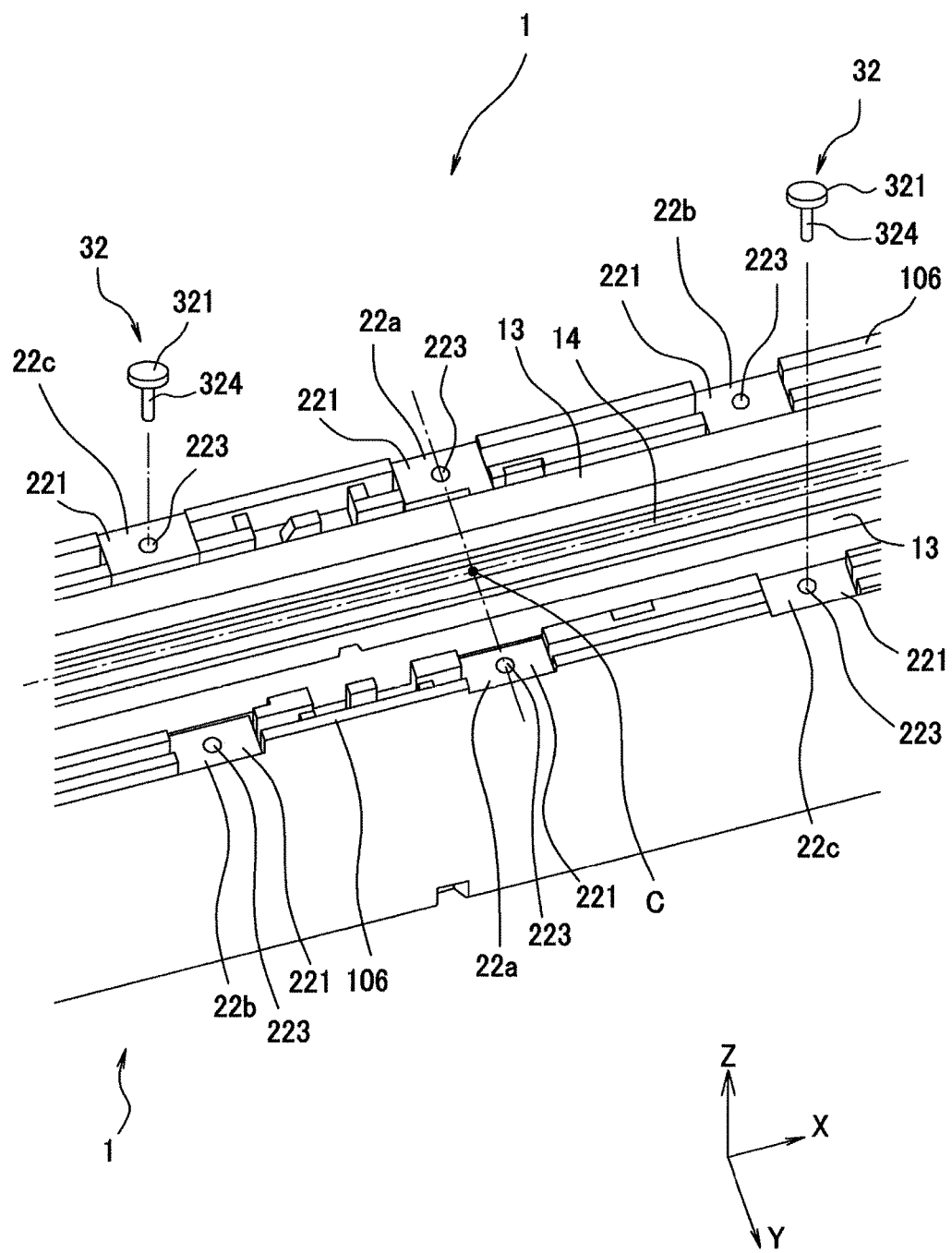
FIG. 6 is a schematic perspective view showing a second spacer and second spacer attachment portions.

Next, a configuration example of the second spacer 32 and the second spacer attachment portions 22a to 22c will be described with reference to FIG. 6. FIG. 6 is a schematic perspective view showing a configuration example of the second spacer 32 and the second spacer attachment portions 22a to 22c.

The second spacer 32 is configured to be capable of being attached to and detached from each of a plurality of second spacer attachment portions 22a to 22c provided on each of the two side walls 106 of the housing 10. In the state where the second spacer 32 is attached to any one of the second spacer attachment portions 22a to 22c, the uppermost end of the second spacer 32 is located above the uppermost end of the housing 10. In the state where the image sensor unit 1 is incorporated in the image reading apparatus 7 or the image forming apparatus 9, the uppermost end of the second spacer 32 abuts against the lower surface of the mount member 72. In this way, a desired distance can be kept between the mount member 72 and the light condenser 14, and the upper focal point of the light condenser 14 can be kept on the upper surface of the mount member 72 (the lower surface of the object P to be read).

The housing 10 includes sets of pairs of second spacer attachment portions 22a to 22c. The paired two second spacer attachment portions 22a, 22b, 22c are configured so that the vertical positions of the uppermost ends of the two second spacers 32 attached thereto are the same. In the state where the second spacers 32 are attached to the second spacer attachment portions 22a, 22b, 22c, the vertical distance from the uppermost end of the housing 10 to the uppermost ends of the second spacers 32 differs between the pairs of second spacer attachment portions. One of the paired two second spacer attachment portions 22a, 22b, 22c is provided on each of the two side walls 106 of the housing 10. Thus, on each of the two side walls 106 of the housing 10, a plurality of second spacer attachment portions 22a to 22c are provided that differ in distance from the uppermost end of the housing 10 to the uppermost end of the second spacer 32 attached thereto.

Viewed in the vertical direction (in the direction of the optical axis of the light condenser 14), the paired two second spacer attachment portions 22a, 22b, 22c are preferably provided point-symmetrically with respect to a central point C of the housing 10. For example, in FIG. 6, the two second spacer attachment portions 22a are paired, the two second spacer attachment portions 22b are paired, and the two second spacer attachment portions 22c are paired. The two second spacer attachment portions 22a are provided at positions that are point-symmetric with respect to the central point C of the housing 10, when viewed in the vertical direction (the direction of the optical axis of the light condenser 14). The same holds true for the two second spacer attachment portions 22b and the two second spacer attachment portions 22c.

In this embodiment of the present invention, the number of pairs of second spacer attachment portions 22a to 22c is the same as the number of pairs of first spacer attachment portions 21a to 22c. And the pairs of first spacer attachment portions 21a to 21c and the pairs of second spacer attachment portions 22a to 22c correspond one by one to each other. When the first spacers 31 and the second spacers 32 are attached to the pair of first spacer attachment portions 21a, 21b, 21c and the pair of second spacer attachment portions 22a, 22b, 22c that correspond to each other, respectively, the vertical positions (positions in the direction of the optical axis of the light condenser 14) of the uppermost ends of the first spacers 31 and the second spacers 32 are the same.

In this embodiment of the present invention, the same number of pairs of second spacer attachment portions 22a to 22c as the number of pairs of first spacer attachment portions 21a to 21c, that is, three pairs of second spacer attachment portions 22a to 22c are provided, for example. Thus, in this case, three second spacer attachment portions 22a to 22c are provided on each of the two side walls 106 of the housing 10. However, the number of pairs of second spacer attachment portions is not limited to three, as far as the number of pairs of second spacer attachment portions is the same as the number of pairs of first spacer attachment portions.

With such a configuration, the vertical distance from the uppermost end of the housing 10 to the uppermost end of the second spacers 32 can be changed stepwise by attaching two second spacers 32 to the paired two second spacer attachment portions 22a, 22b, 22c. Thus, in the state where the image sensor unit 1 is incorporated in the image reading apparatus 7 or the image forming apparatus 9, the vertical position of the upper focal point of the light condenser 14 can be changed stepwise so that the upper focal point of the light condenser 14 is positioned on the upper surface of the mount member 72.

As described above, one of the paired two second attachment portions 22a, 22b, 22c is provided on each of the two side walls 106 of the housing 10. Thus, once the two second spacers 32 are attached to the paired two second spacer attachment portions 22a, 22b, 22c, one second spacer 32 is attached to each of the two side walls 106 of the housing 10. As described above, viewed in the vertical direction (in the direction of the optical axis of the light condenser 14), the paired two second spacer attachment portions 22a, 22b, 22c are provided point-symmetrically with respect to the center C of the housing 10. With such a configuration, when the second spacers 32 abut against the mount member 72, the housing 10 can be prevented from being inclined with respect to the mount member 72.

As shown in FIG. 6, the second spacer 32 has a main body portion 321 and a holding portion 324. The second spacer 32 is made of a resin material, for example, and the main body portion 321 and the holding portion 324 are integrally formed by injection molding.

The main body portion 321 has a plate-like or block-like shape and has a predetermined dimension in the vertical direction. For example, the main body portion 321 may be a plate or block having a circular or rectangular shape when viewed in the vertical direction. However, the main body portion 321 is not limited to any specific shape. The main body portion 321 can have any dimensions and shape as far as the main body portion 321 can be mounted on a supporting portion 221 of each of the plurality of second spacer attachment portions 22a to 22c. As with the first spacer 31, an abutment portion that protrudes upward may be provided on an upper surface of the main body portion 321. If the abutment portion is provided, the upper end of the abutment portion forms the uppermost end of the whole of the second spacer 32 and abuts against the lower surface of the mount member 72. For example, the abutment portion may have a columnar or semispherical shape that protrudes upward from the upper surface of the main body portion 321. The shape of the abutment portion is not particularly limited. The abutment portion may not be provided on the main body portion 321. In that case, the upper surface of the main body portion 321 forms the uppermost end of the second spacer 32 and abuts against the lower surface of the mount member 72. Although the dimension in the vertical direction of the main body portion 321 is not limited to any specific value, the dimension is determined so that the uppermost end (the upper surface of the main body portion 321 or the upper end of the abutment portion) protrudes upward beyond the upper surface of the housing 10 when the second spacer 32 is attached to the one of the plurality of second spacer attachment portions 22a to 22c that is the lowest in the vertical direction.

The holding portion 324 that holds the second spacer 32 on the second spacer attachment portion 22a, 22b or 22c (prevents the second spacer 32 from coming off the second spacer attachment portion 22a, 22b or 22c) may be provided on the lower surface of the main body portion 321. In the example shown in FIG. 6, the holding portion 324 is a protrusion that protrudes downward from the lower surface of the main body portion 321. In this case, the second spacer 32 is substantially T-shaped in side view. However, the configuration of the holding portion 324 is not particularly limited.

Each of the plurality of second spacer attachment portions 22a to 22c has the supporting portion 221 on which the main body portion 321 of the second spacer 32 can be mounted and a holding hole 223 in which the holding portion 324 can be fitted. The supporting portion 221 is a recessed portion formed in the upper surface of the side wall 106 of the housing 10, for example. The supporting portion 211 is not limited to any specific configuration, as far as the main body portion 321 of the second spacer 32 (that is, at least a part of the second spacer 32) can be mounted on the supporting portion 221. The holding hole 223 is formed in the supporting portion 221 (that is, a bottom surface of the recessed portion). The holding hole 223 is not limited to any specific configuration, as far as the holding portion 324 of the second spacer 32 can be fitted in the holding hole 223.

The supporting portions 221 (that is, the bottom surfaces of the recessed portions) of the plurality of second spacer attachment portions 22a to 22c provided on each of the two side walls 106 differ in vertical position. Thus, depending on to which of the second spacer attachment portions 22a to 22c the second spacers 32 are attached, the vertical distance between the uppermost end of the housing 10 to the uppermost ends of the second spacers 32 varies. The vertical positions of the supporting portions 221 of the paired two second spacer attachment portions 22a, 22b, 22c are the same, and the vertical positions of the uppermost ends of the two second spacers 32 attached thereto are also the same. The plurality of second spacer attachment portions 22a to 22c, the vertical positions of the supporting portions 221 of which differ, are provided side by side in the longer dimension direction on each of the two side walls 106 of the housing 10. In the example shown in FIG. 6, three second spacer attachment portions 22a to 22c, the vertical positions of the supporting portions 221 of which differ from each other, are provided on each of the side walls 106 of the housing 10 in a middle part in the longer dimension direction (between the plurality of first spacer attachment portions 21a to 21c provided at the opposite ends).

The second spacer 32 can be detachably attached to each of the plurality of second spacer attachment portions 22a to 22c. Once the second spacer 32 is attached to the second spacer attachment portion 22a, 22b or 22c, the main body portion 321 of the second spacer 32 is mounted on the upper surface of the supporting portion 221 of the second spacer attachment portion 22a, 22b or 22c, and the holding portion 324 of the second spacer 32 is fitted in the holding hole 223. Thus, the second spacer 32 is kept in the state where the second spacer 32 is attached to the second spacer attachment portion 22a, 22b or 22c. The second spacer 32 can be removed from the second spacer attachment portion 22a, 22b or 22c by drawing the holding portion 324 of the second spacer 32 from the holding hole 223. The plurality of second spacer attachment portions 22a to 22c have the same configuration, except for the vertical position of the supporting portion 221. Thus, the same second spacer 32 can be attached to any of the plurality of second spacer attachment portions 22a to 22c. Thus, the second spacer 32 can be detachably attached to each of the plurality of second spacer attachment portions 22a to 22c.

The vertical positions of the supporting portions 221 of the plurality of second spacer attachment portions 22a to 22c provided on each of the two side walls 106 differ from each other. In addition, the light condenser 14 is housed and fixed in the light condenser housing portion 102 of the housing 10. Thus, in the state where the second spacer 32 is attached to the second spacer attachment portion 22a, 22b or 22c, the vertical distance from the uppermost end of the housing 10 to the uppermost end of the second spacer 32 differs between the second spacer attachment portions 22a to 22c to which the second spacer 32 is attached. Thus, the vertical position of the upper focal point of the light condenser 14 (in particular, the relative positional relationship between the upper focal point of the light condenser 14 and the upper surface of the mount member 72) can be changed stepwise by selectively attaching the second spacer 32 to any one of the plurality of second spacer attachment portions 22a to 22c.

(Another Configuration Example of Second Spacer and Second Spacer Attachment Portion)

Next, another configuration example of the second spacer 32 and the second spacer attachment portions 22a to 22c will be described with reference to FIG. 7. FIG. 7 is a schematic perspective view showing another configuration example of the second spacer 32 and the second spacer attachment portions 22a to 22c. As shown in FIG. 7, a second spacer 33 in another example has a main body portion 331 and a holding portion 334 that extends downward from one end in the sub-scan direction of the main body portion 331. The main body portion 331 of the second spacer 33 can have the same configuration as the main body portion 311 of the first spacer 31. That is, the main body portion 331 can include an abutment portion 332 that protrudes upward from the upper surface of the main body portion 331 and a positioning portion 333 that protrudes downward. A tip end (lower end) of the holding portion 334 extends to one side in the sub-scan direction that is the same side as the main body portion 331. Thus, the second spacer 33 is substantially C-shaped when viewed in the longer dimension direction of the image sensor unit 1. The second spacer attachment portions 22a to 22c have the supporting portion 221 and a locking counterpart 222. The supporting portion 221 can have the same configuration as described above. The locking counterpart 222 is a recess structure formed in the lower end face of the side wall 106 of the housing 10 and is provided below the supporting portion 221 (for example, at a position that overlaps with the position of the supporting portion 221 when viewed in the vertical direction).

The second spacer 32 can be attached to the second spacer attachment portion 22a, 22b or 22c by mounting the main body portion 331 of the second spacer 33 on the supporting portion 221 of the second spacer attachment portion 22a, 22b or 22c and engaging an locking portion 335 provided at the tip end of the holding portion 334 of the second spacer 33 with the locking counterpart 222 of the second spacer attachment portion 22a, 22b or 22c. In the state where the second spacer 33 is attached to the second spacer attachment portion 22a, 22b or 22c, the uppermost end of the second spacer 33 (the upper end of the abutment portion 332 if the abutment portion 332 is provided) protrudes upward beyond the uppermost end of the side wall 106 of the housing 10. In addition, the side wall 106 of the housing 10 is vertically held between the main body portion 331 of the second spacer 33 and the locking portion 335 at the tip end of the holding portion 334. Thus, the second spacer 33 is held in the state where the second spacer 33 is attached to the second spacer attachment portion 22a, 22b or 22c. To remove the second spacer 33 from the second spacer attachment portion 22a, 22b or 22c, the holding portion 334 and the locking portion 335 can be elastically deformed. In this way, the second spacer 33 can be detachably attached to the second spacer attachment portions 22a to 22c.

(Method of Use and Advantages)

Next, a method of use and advantages of the first spacer 31 and the second spacers 32 and 33 will be described. Depending on the dimensional tolerance or assembly tolerance of each member of the image sensor unit 1, the actual vertical position of the upper focal point of the light condenser 14 (the vertical position with respect to the uppermost end of the housing 10, for example) may deviate from the design position. For example, if the light condenser 14 is misaligned with respect to the housing 10 when the light condenser 14 is assembled to the housing 10, the vertical distance from the upper end face of the housing 10 to the upper focal point of the light condenser 14 may deviate from the design value. In that case, if the distance between the mount member 72 and the housing 10 is set at the design value in the state where the image sensor unit 1 is incorporated in the image reading apparatus 7 or the image forming apparatus 9, the position of the upper focal point of the light condenser 14 may vertically deviate from the upper surface of the mount member 72. In general, the rod-lens array used as the light condenser 14 has a shallow depth of focus, so that if the actual vertical position of the upper focal point of the light condenser 14 vertically deviates from the design vertical position, the image sensor unit 1 outputs an out-of-focus blurred image. In this way, the quality (in particular, resolution) of the image output by the image sensor unit 1 is affected by the dimensional tolerance or assembly tolerance of each member of the image sensor unit 1. And the tolerances differ between individual members, so that the deviation between the actual position of the upper focal point of the light condenser 14 and the design position also differs between individual image sensor units.

As described above, the supporting portions 211 of the plurality of pairs of first spacer attachment portions 21a to 21c and the supporting portions 221 of the plurality of pairs of second spacer attachment portions 22a to 22c differ in vertical position between the pairs. With such a configuration, the vertical distance from the uppermost end of the housing 10 to the uppermost end of the first spacer 31 and the uppermost end of the second spacer 32 or 33 (the upper end of the abutment portion 312 or 332 if the abutment portion 312 or 332 is provided) varies depending on to which of the first spacer attachment portions 21a to 21c and the second spacer attachment portions 22a to 22c the first spacer 31 and the second spacer 32 or 33 are attached, respectively. Thus, in the state where the uppermost ends of the first spacer 31 and the second spacer 32 or 33 abut against the lower surface of the mount member 72, the relative positional relationship between the upper focal point of the light condenser 14 and the upper surface of the mount member 72 varies depending on to which of the first spacer attachment portions 21a to 21c and the second spacer attachment portions 22a to 22c the first spacer 31 and the second spacer 32 or 33 are attached, respectively. Thus, one first spacer 31 and one second spacer 32 or 33 are selectively attached to each of one of the plurality of pairs of first spacer attachment portions 21a to 21c and each of one of the plurality of pairs of second spacer attachment portions 22a to 22c, respectively. In this process, the first spacers 31 and the second spacers 32, 33 are attached to the two first spacer attachment portions 21a, 21b or 21c and the two second spacer attachment portions 22a, 22b or 22c of the corresponding pairs. Thus, in the state where the uppermost ends of the first spacers 31 and the second spacers 32, 33 abut against the lower surface of the mount member 72, the upper focal point of the light condenser 14 can be positioned on the upper surface of the mount member 72. Attachment of the first spacers 31 and the second spacers 32, 33 (that is, adjustment of the vertical position of the upper focal point of the light condenser 14) can be performed for each image sensor unit 1 after completion of assembly thereof.

The image sensor unit 1 with the first spacers 31 and the second spacers 32, 33 attached thereto is biased upward by a biasing member 18 (see FIG. 4) when the image sensor unit 1 is incorporated in the image reading apparatus 7 or the image forming apparatus 9. And the uppermost ends of the first spacer 31 and the second spacer 32 or 33 are kept in the state where the uppermost ends abut against the lower surface of the mount member 72. In this state, the positioning portions 313 provided on the main body portion 311 of the first spacer 31 are kept fitted in the positioning recesses 213 provided in the first spacer attachment portion 21a, 21b or 21c, so that the main body portion 311 of the first spacer 31 does not come off the supporting portion 211 of the first spacer attachment portion 21a, 21b or 21c. Thus, the main body portion 311 of the first spacer 31 is kept in the state where the main body portion 311 is mounted on the supporting portion 211 of the first spacer attachment portion 21a, 21b or 21c. In addition, the holding portion 324 of the second spacer 32 is kept fitted in the holding hole 223 of the second spacer attachment portion 22a, 22b or 22c. Thus, the main body portion 321 of the second spacer 32 does not come off the supporting portion 221 of the second spacer attachment portion 22a, 22b or 22c. The second spacer 33 in the other example holds the side wall 106 between the main body portion 331 and the locking portion 335 from above and below. Thus, the main body portion 321 or 331 of the second spacer 32 or 33 is kept in the state where the main body portion 321 or 331 is mounted on the supporting portion 221 of the second spacer attachment portion 22a, 22b or 22c.

With such a configuration, the types or number of the members involved in adjustment of the vertical position of the upper focal point of the light condenser 14 can be reduced. For example, with a configuration in which the vertical position of the upper focal point of the light condenser 14 is changed with a sheet-like spacer or shim, a plurality types of spacers or shims of different thicknesses need to be prepared in advance. And it takes some effort to manage those spacers or shims. In addition, a plurality of types of members of different dimensions or the like need to be produced, so that the manufacturing cost of the image sensor unit 1 increases. To the contrary, according to this embodiment of the present invention, only one type of first spacer 31 and one type of second spacer 32 or 33 are needed. The first spacer 31 and the second spacer 32 or 33 can be managed with less effort, and the types of members manufactured can be reduced, so that the manufacturing cost of the image sensor unit 1 can be reduced.

As described above, viewed in the vertical direction (in the direction of the optical axis of the light condenser 14), the two second spacer attachment portions 22a, 22b, 22c the vertical positions of the supporting portions 221 of which are the same are preferably provided at positions that are point-symmetric with respect to the center C of the housing 10. With such a configuration, the two second spacers 32, 33 abut against the lower surface of the mount member 72 at two positions that are point-symmetric with respect to the center C of the housing 10 when viewed in the vertical direction (in the direction of the optical axis of the light condenser 14). Thus, the housing 10 is prevented from being inclined with respect to the mount member 72. That is, if the two second spacer attachment portions 22a, 22b, 22c whose vertical positions are the same are not provided, and only one second spacer 32 or 33 is provided, for example, the housing 10 can be inclined with respect to the lower surface of the mount member 72 with the one second spacer 32 or 33 that abuts against the lower surface of the mount member 72 serving as a fulcrum. And if the housing 10 is inclined with respect to the lower surface of the mount member 72, the distance from the upper surface of the light condenser 14 to the upper surface of the mount member 72 is nonuniform. Then, the image sensor unit 1 can output a partially blurred image. However, according to this embodiment of the present invention, the housing 10 is prevented from being inclined with respect to the lower surface of the mount member 72, the distance between the upper surface of the light condenser 14 and the mount member 72 is kept uniform. Thus, the quality of the image output by the image sensor unit 1 can be improved (deterioration of the quality of the image can be prevented).

According to this embodiment of the present invention, the vertical position of the upper focal point of the light condenser 14 can be easily changed (adjusted). For example, with the configuration that involves a plurality of different spacers or shims described above, a selection from among the plurality of types of spacers or shims has to be made by trial and error. However, according to this embodiment of the present invention, only one type of first spacer 31 and only one type of second spacer 32 or 33 are used, and the vertical position of the upper focal point of the light condenser 14 can be changed simply by removing the first spacer 31 and the second spacer 32 or 33 from the first spacer attachment portion 21a, 21b or 21c and the second spacer attachment portion 22a, 22b or 22c and attaching the first spacer 31 and the second spacer 32 or 33 to another first spacer attachment portion 21a, 21b or 21c and another second spacer attachment portion 22a, 22b or 22c, respectively. In addition, according to this embodiment of the present invention, the first spacer 31 and the second spacer 32 or 33 can be attached to the first spacer attachment portion 21a, 21b or 21c and the second spacer attachment portion 22a, 22b or 22c, respectively, by pressing the first spacer 31 and the second spacer 32 or 33. Thus, the vertical position of the upper focal point of the light condenser 14 can be easily adjusted.

With a configuration that involves a double-sided adhesive tape, the double-sided adhesive tape needs to be peeled off and applied again to change the first spacer 31 and the second spacer 32 or 33. It takes some effort to perform this. However, according to this embodiment of the present invention, without the double-sided adhesive tape, the first spacer 31 can be kept in the state where the first spacer 31 is attached to the first spacer attachment portion 21a, 21b or 21c, and the second spacer 32 or 33 is kept in the state where the second spacer 32 or 33 is attached to the second spacer attachment portion 22a, 22b or 22c. Thus, the vertical position of the upper focal point of the light condenser 14 can be easily adjusted.

Furthermore, according to this embodiment of the present invention, the first spacer 31, the second spacers 32 and 33, the first spacer attachment portions 21a to 21c and the second spacer attachment portions 22a to 22c can have a reduced size. For example, with the configuration in which the double-sided adhesive tape is used to attach the first spacer 31 and the second spacer 32 or 33 to the first spacer attachment portion 21a, 21b or 21c and the second spacer attachment portion 22a, 22b or 22c, respectively, it is difficult to control the thickness of the double-sided adhesive tape, so that the double-sided adhesive tape has to be kept out of the region that is involved in the distance adjustment. Thus, the first spacer attachment portions 21a to 21b, the second spacer attachment portions 22a to 22c, the first spacer 31 and the second spacer 32 or 33 have to have a region where the double-sided adhesive tape is applied that is not involved in the actual distance adjustment. Accordingly, the first spacer 31 and the second spacer 32 or 33 inevitably have an increased size, and the first spacer attachment portions 21a to 21c and the second spacer attachment portions 22a to 22c also inevitably have an increased size. As a result, the size of the image sensor unit 1 increases. However, according to this embodiment, since no adhesive tape is used, a region where the adhesive tape is applied is not necessary. Thus, the first spacer 31, the second spacers 32 and 33, the first spacer attachment portions 21a to 21c and the second spacer attachment portions 22a to 22c can have a reduced size. In addition, the image sensor unit 1 can have a reduced size.

Although the image sensor unit 1 has no cover member that covers the housing 10 from above in this embodiment of the present invention, the image sensor unit 1 may have a cover member. In that case, the first spacer attachment portions 21a to 21c and the first spacer 31 are configured so that the uppermost end of the first spacer 31 is located above the upper surface of the cover member when the first spacer 31 is attached to the first spacer attachment portion 21a, 21b or 21c. Similarly, the second spacer attachment portions 22a to 22c and the second spacer 32 or 33 are configured so that the uppermost end of the second spacer 32 or 33 is located above the upper surface of the cover member when the second spacer 32 or 33 is attached to the second spacer attachment portion 22a, 22b or 22c. To prevent interference between the cover member and the second spacer 32 or 33, the cover member has notches or the like at positions corresponding to the second spacer attachment portions 22a to 22c. Alternatively, the dimension of the cover member in the sub-scan direction may be smaller than the distance between the side walls 106.

Although the second spacer attachment portions 22a to 22c are provided on the side walls 106 of the housing 10 in this embodiment, the positions at which the second spacer attachment portions 22a to 22c are provided are not limited to the positions on the side walls 106. It is essential only that the second spacer attachment portions 22a to 22c are provided at positions on the upper surface of the housing 10 where the second spacer attachment portions 22a to 22c do not interfere with the light guide 12, the light condenser 14 and the like. For example, with a configuration in which the housing 10 has no side wall 106, the second spacer attachment portions may be provided side by side in the longer dimension direction along or in the vicinity of the opposite ends (that is, the longer sides in vertical view) of the housing 10 in the sub-scan direction (one of the shorter dimension directions).

Furthermore, although the housing 10 includes both the first spacer attachment portions 21a to 21c and the second spacer attachment portions 22a to 22c in this embodiment, only one of the first spacer attachment portions 21a to 21c and the second spacer attachment portions 22a to 22c may be provided.

<Image Reading Apparatus>

Next, a configuration example of the image reading apparatus 7 will be described with reference to FIG. 8. FIG. 8 is a schematic external perspective view showing a configuration example of the image reading apparatus 7 that can incorporate the image sensor unit 1 according to an embodiment of the present invention. According to this embodiment, the image reading apparatus 7 is a flatbed scanner. The image reading apparatus 7 has a housing 71, a platen glass, which is an example of the mount member 72, the image sensor unit 1, a drive mechanism that drives the image sensor unit 1, a circuit board 73, and a platen cover 74. The platen glass, which is an example of the mount member 72, is made of a transparent plate, such as of glass, and is attached to the upper surface of the housing 71. The platen cover 74 is attached to the housing 71 by a hinge mechanism in an openable and closable manner so as to cover the object P to be read mounted on the mount member 72. The image sensor unit 1, the drive mechanism that drives the image sensor unit 1, and the circuit board 73 are housed in the housing 71.

The drive mechanism includes a holding member 750, a guide shaft 751, a drive motor 752, and a wire 754. The holding member 750 surrounds and holds the image sensor unit 1. The biasing member 18 (see FIG. 4) is provided between the holding member 750 and the image sensor unit 1. The biasing member 18 biases the image sensor unit 1 toward the mount member 72 to keep the first spacer 31 and the second spacer 32 in contact with the lower surface of the mount member 72. The guide shaft 751 guides the holding member 750 in such a manner that the holding member 750 can move along the mount member 72 in a reading direction (sub-scan direction). The drive motor 752 and the holding member 750 are coupled by the wire 754, and the holding member 750 holding the image sensor unit 1 is moved in the sub-scan direction by the driving force of the drive motor 752. The image sensor unit 1 reads the object P to be read mounted on the mount member 72 while moving in the sub-scan direction by the driving force of the drive motor 752. In this way, the image reading apparatus 7 reads the object P to be read while relatively moving the image sensor unit 1 and the object P to be read in the sub-scan direction.

On the circuit board 73, an image processing circuit that performs a predetermined image processing on the image read by the image sensor unit 1, a control circuit that controls each portion of the image reading apparatus 7 including the image sensor unit 1, a power supply circuit that supplies electric power to each portion of the image reading apparatus 7 are built, for example.

Although the flatbed scanner has been described above as an example of the image reading apparatus 7 incorporating the image sensor unit 1 to which the present invention can be applied, the image reading apparatus 7 is not limited to the flatbed scanner. It is essential only that the image reading apparatus has the mount member 72, such as a platen glass, on which the object P to be read is mounted, and reads the object P to be read while sliding the image sensor unit 1 with respect to the mount member 72.

<Image Forming Apparatus>

Figure 9:
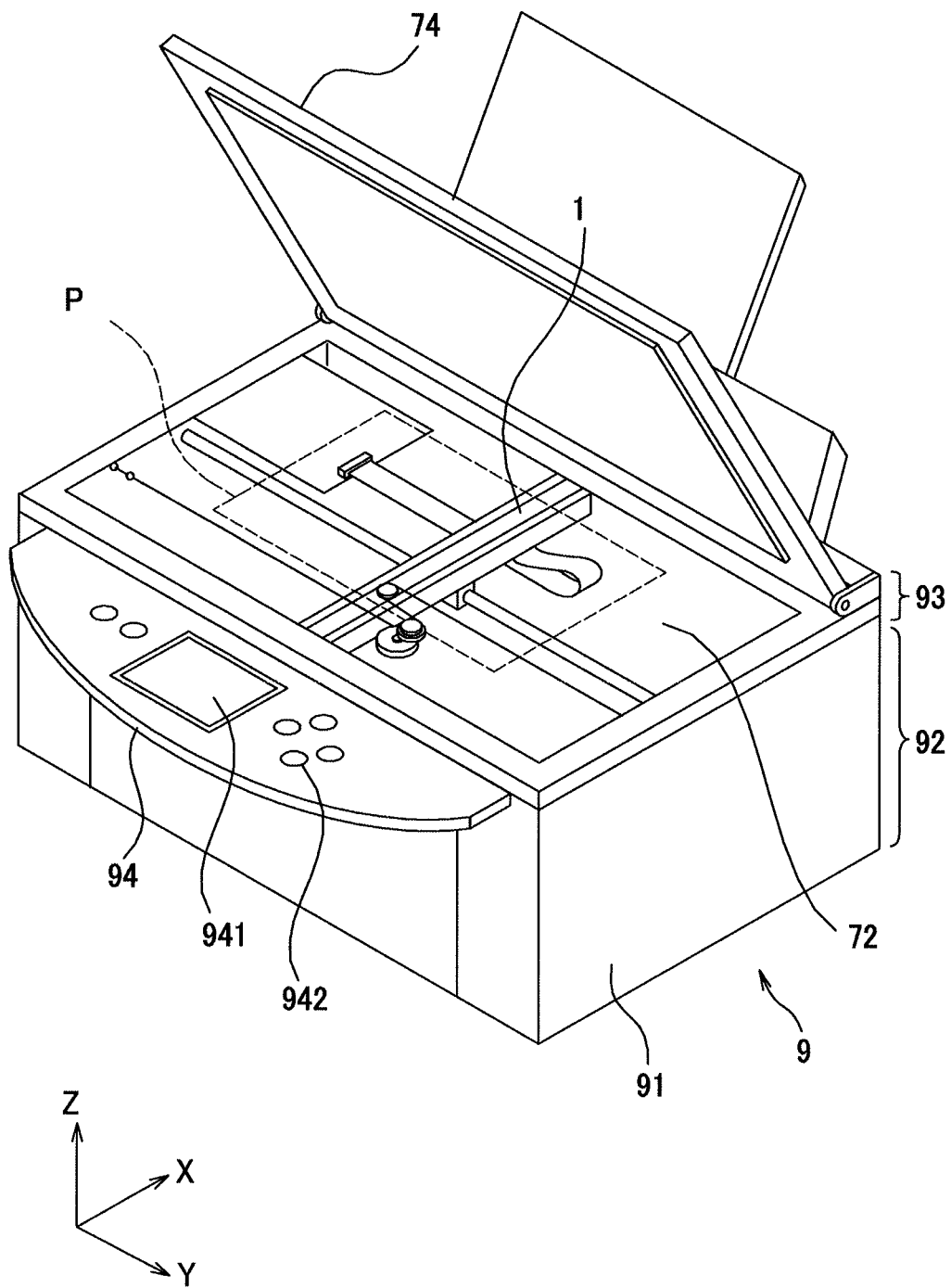
FIG. 9 is an external perspective view of an image forming apparatus.
Figure 10:
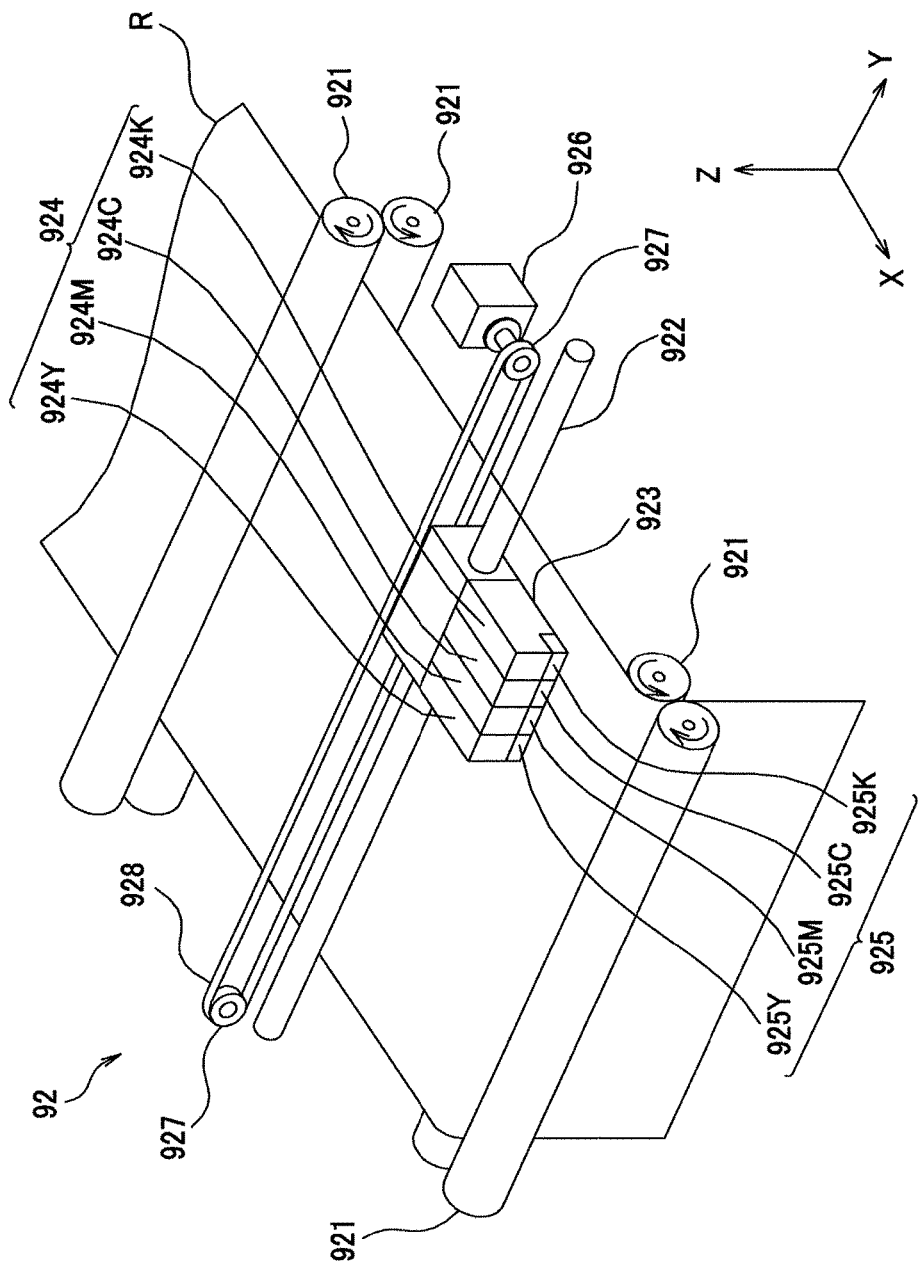
FIG. 10 is a perspective view showing an image forming portion of the image forming apparatus.

Next, the image forming apparatus 9 according to an embodiment of the present invention will be described with reference to FIGS. 9 and 10. The image forming apparatus 9 according to this embodiment of the present invention incorporates the image sensor unit 1 according to another embodiment of the present invention. FIG. 9 is an external perspective view of the image forming apparatus 9. FIG. 10 is a perspective view of an image forming portion 92 provided in a housing 91 of the image forming apparatus 9. As shown in FIGS. 9 and 10, the image forming apparatus 9 is a multifunction printer (MFP) that doubles as a flatbed scanner and an inkjet printer. The image forming apparatus 9 has an image reading portion 93 serving as image reading means that reads an image and the image forming portion 92 serving as image forming means that forms an image. The image reading portion 93 of the image forming apparatus 9 incorporates the image sensor unit 1. The image reading portion 93 of the image forming apparatus 9 can have the same configuration as the image reading apparatus 7 described above. Descriptions of the components common to those of the image reading apparatus 7 will be omitted.

As shown in FIG. 9, the image forming apparatus 9 includes an operation portion 94. The operation portion 94 includes a display portion 941 that displays an operation menu or various messages and various operation buttons 942 for operating the image forming apparatus 9. As shown in FIG. 10, the image forming portion 92 is provided in the housing 91 of the image forming apparatus 9. The image forming portion 92 has conveyor rollers 921, a guide shaft 922, an inkjet cartridge 923, a motor 926, and a pair of timing pulleys 927. The conveyor rollers 921 rotate by the driving force of a driving source and convey printing paper R as a recoding medium in a feeding direction. The guide shaft 922 is a rod-like member and is fixed to the housing 91 of the image forming apparatus 9 in such a manner that an axis thereof is in parallel to a width direction (a direction perpendicular to the feeding direction) of the printing paper R.

The inkjet cartridge 923 can slide on the guide shaft 922 to move back and forth in the width direction of the printing paper R. For example, the inkjet cartridge 923 includes ink tanks 924 (924C, 924M, 924Y, and 924K) with cyan C, magenta M, yellow Y, and black K inks and discharge heads 925 (925C, 925M, 925Y, and 925K) arranged on the respective ink tanks 924. One of the pair of timing pulleys 927 is attached to a rotating shaft of the motor 926. The pair of timing pulleys 927 are provided at positions apart from each other in the width direction of the printing paper R. A timing belt 928 is wound around the pair of timing pulleys 927 in parallel with the pair of timing pulleys 927 and is coupled to the inkjet cartridge 923 at a predetermined section.

The image reading portion 93 of the image forming apparatus 9 converts the image read by the image sensor unit 1 into an electric signal in a form suitable for printing. The image forming portion 92 of the image forming apparatus 9 drives the conveyor rollers 921, the motor 926, and the inkjet cartridge 923 based on the electric signal converted by the image sensor unit 1 of the image reading portion 93 and forms an image on the printing paper R. In addition, the image forming portion 92 of the image forming apparatus 9 can form an image based on an electric signal input from the outside. The configuration and operation of the image forming portion 92 of the image forming apparatus 9 can be the same as those of various well-known printers. Thus, detailed descriptions thereof will be omitted. Although an inkjet-type image forming apparatus has been described as the image forming portion 92, the image forming apparatus can be of any type, such as an electrophotographic type, a thermal transfer type, and a dot impact type.

Although embodiments and examples of the present invention have been described above, the embodiments and examples described above are just specific examples for carrying out the present invention. The technical scope of the present invention is not limited to the embodiments and examples described above. Various modifications can be made without departing from the spirit of the present invention.

For example, the image reading apparatus to which the present invention can be applied is not limited to the image scanner having the configuration described above with regard to the above embodiment. The image forming apparatus is not limited to the inkjet type but can be of any type, such as the electrophotographic type, the thermal transfer type, and the dot impact type, and is not limited to the multifunction printer described with regard to the above embodiment. A copying machine and a facsimile that incorporate the image sensor unit according to the present invention are also included in image reading apparatuses according to the present invention.

The present invention can be effectively used for an image sensor unit, and an image reading apparatus and an image forming apparatus (such as an image scanner, a facsimile, a copying machine, or a multifunction printer) that incorporate the image sensor unit.

According to the present invention, the types of members used for adjusting the distance to the object to be read can be reduced.

What is claimed is:

1. An image sensor unit configured to read an object to be read mounted on a mount member via the mount member, comprising:
    a light condenser that collects light from the object to be read;
    an image sensor that receives the light collected by the light condenser; and
    a frame that supports the light condenser and the image sensor,
    wherein the frame includes a first spacer attachment portion and a second spacer attachment portion to which a spacer can be attached, and a first distance between the frame and the mount member in a case where the spacer is attached to the first spacer attachment portion and a second distance between the frame and the mount member in a case where the spacer is attached to the second spacer attachment portion are different from each other.

2. The image sensor unit according to claim 1, wherein the first spacer attachment portion and the second spacer attachment portion whose positions in the direction of the optical axis of the light condenser differ from each other are configured so that distances between the housing and the mount member in the direction of the optical axis of the light condenser differ from each other in a state where the attached spacer abuts against the mount member.

3. The image sensor unit according to claim 1, wherein the first spacer attachment portion and the second spacer attachment portion have a supporting portion that is provided on a side of the housing that faces the mount member and on which at least a part of the spacer can be mounted, and
    positions of the supporting portions of the first spacer attachment portion and the second spacer attachment portion whose positions in the direction of the optical axis of the light condenser differ from each other differ from each other.

4. The image sensor unit according to claim 1, wherein the first spacer attachment portion and the second spacer attachment portion for which the distances between the housing and the spacer in a state where the spacer abuts against the mount member differ from each other are provided at each of opposite ends in a longer dimension direction of the housing.

5. The image sensor unit according to claim 1, wherein each of the first spacer attachment portion and the second spacer attachment portion provided at one end in a longer dimension direction of the housing and a corresponding one of the first spacer attachment portion and the second spacer attachment portion provided at the other end in the longer dimension of the housing are the same in distance between the housing and the spacer in a state where the spacer abuts against the mount member, and
    the first spacer attachment portion and the second spacer attachment portion for which the distances between the housing and the spacer in the state where the spacer abuts against the mount member are the same are provided line-symmetrically with respect to the housing.

6. The image sensor unit according to claim 1, wherein the first spacer attachment portion and the second spacer attachment portion for which the distances between the housing and the spacer in a state where the spacer abuts against the mount member differ from each other are provided at each of opposite ends in a shorter dimension direction of the housing in a middle part in a longer dimension direction of the housing.

7. The image sensor unit according to claim 1, wherein each of the first spacer attachment portion and the second spacer attachment portion provided at one end in a shorter dimension direction of the housing and a corresponding one of the first spacer attachment portion and the second spacer attachment portion provided at the other end in the shorter dimension of the housing are the same in distance between the housing and the spacer in a state where the spacer abuts against the mount member, and
    the first spacer attachment portion and the second spacer attachment portion for which the distances between the housing and the spacer in the state where the spacer abuts against the mount member are the same are provided point-symmetrically with respect to the housing.

8. The image sensor unit according to claim 1, wherein the spacer is attached to one of the first spacer attachment portion and the second spacer attachment portion.

9. An image reading apparatus that reads reflected light from an object to be read while relatively moving an image sensor unit and the object to be read,
    wherein the image sensor unit is configured to read the object to be read mounted on a mount member via the mount member, the image sensor unit comprising:
    a light condenser that collects light from the object to be read;
    an image sensor that receives the light collected by the light condenser; and
    a frame that supports the light condenser and the image sensor,
    wherein the frame includes a first spacer attachment portion and a second spacer attachment portion to which a spacer can be attached, and a first distance between the frame and the mount member in a case where the spacer is attached to the first spacer attachment portion and a second distance between the frame and the mount member in a case where the spacer is attached to the second spacer attachment portion are different from each other.

10. An image forming apparatus comprising:
image reading means that reads reflected light from an object to be read while relatively moving an image sensor unit and the object to be read; and
image forming means that forms an image on a recording medium,
wherein the image sensor unit is configured to read the object to be read mounted on a mount member via the mount member, the image sensor unit comprising:
a light condenser that collects light from the object to be read;
an image sensor that receives the light collected by the light condenser; and
a frame that supports the light condenser and the image sensor,
wherein the frame includes a first spacer attachment portion and a second spacer attachment portion to which a spacer can be attached, and a first distance between the frame and the mount member in a case where the spacer is attached to the first spacer attachment portion and a second distance between the frame and the mount member in a case where the spacer is attached to the second spacer attachment portion are different from each other.

* * * * *